(12) United States Patent
Sampath et al.

(10) Patent No.: US 9,516,634 B2
(45) Date of Patent: Dec. 6, 2016

(54) SYSTEMS AND METHODS FOR DOWNLINK FREQUENCY DOMAIN MULTIPLEXING TRANSMISSIONS

(71) Applicant: QUALCOMM Incorporated, San Diego, CA (US)

(72) Inventors: Hemanth Sampath, San Diego, CA (US); Bin Tian, San Diego, CA (US); Rahul Tandra, San Diego, CA (US); Gwendolyn Denise Barriac, Encinitas, CA (US); Yan Zhou, San Diego, CA (US); Sameer Vermani, San Diego, CA (US); Simone Merlin, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 14/266,751

(22) Filed: Apr. 30, 2014

(65) Prior Publication Data

US 2014/0328265 A1 Nov. 6, 2014

Related U.S. Application Data

(60) Provisional application No. 61/819,109, filed on May 3, 2013.

(51) Int. Cl.
*H04W 16/14* (2009.01)
*H04W 72/04* (2009.01)
(Continued)

(52) U.S. Cl.
CPC .......... *H04W 72/042* (2013.01); *H04W 16/10* (2013.01); *H04W 16/14* (2013.01);
(Continued)

(58) Field of Classification Search
CPC . H04L 45/74; H04L 5/0007; H04L 27/2602; H04L 5/0053; H04L 5/005; H04L 1/0079; H04L 5/0094; H04L 5/0033; H04L 5/001; H04L 5/0044; H04W 28/06; H04W 40/02; H04W 72/04; H04W 72/0406; H04W 28/065; H04W 72/042; H04W 84/12
See application file for complete search history.

(56) References Cited

U.S. PATENT DOCUMENTS 7,826,438 B1 * 11/2010 Salhotra ................. H04L 1/188
370/345
8,059,607 B1 * 11/2011 Shaw ..................... H04B 7/061
370/329

(Continued)

FOREIGN PATENT DOCUMENTS

WO WO-2006083021 A1 8/2006
WO WO-2009073744 A2 6/2009
(Continued)

OTHER PUBLICATIONS

Gong M. et al., "Medium Access for Wider Bandwidth", IEEE 802.11-10/1084r0, Sep. 12, 2010,URL https://mentor.eee.org/802.11/dcn/10/11-10-1084-00-00ac-medium-access-for-wider-bandwidth.pptx.; 23 pages.
(Continued)

*Primary Examiner* — Jung-Jen Liu
(74) *Attorney, Agent, or Firm* — Knobbe, Martens, Olson & Bear, LLP

(57) ABSTRACT

Systems, methods, and devices for transmitting data are described herein. In some aspects, a method comprises generating a first message. The first message may comprise an allocation of a first station to a first frequency channel and a second station to a second frequency channel. The method further comprises transmitting the first message over the first frequency channel and the second frequency channel. The method further comprises transmitting, after transmission of the first message, a second message to the first station using the first frequency channel. The method further comprises transmitting, after transmission of the first message, a third message to the second station using the second frequency channel.

43 Claims, 24 Drawing Sheets

(51) Int. Cl.
*H04W 74/08* (2009.01)
*H04W 16/10* (2009.01)
*H04W 72/08* (2009.01)
*H04W 84/12* (2009.01)

(52) U.S. Cl.
CPC ......... *H04W 72/04* (2013.01); *H04W 72/082* (2013.01); *H04W 74/085* (2013.01); *H04W 72/0453* (2013.01); *H04W 84/12* (2013.01)

(56) References Cited

U.S. PATENT DOCUMENTS

| | | | |
|---|---|---|---|
| 8,472,383 B1* | 6/2013 | Banerjea | H04W 72/0473 370/328 |
| 8,817,756 B1 | 8/2014 | Hart et al. | |
| 2002/0163933 A1* | 11/2002 | Benveniste | H04L 47/10 370/465 |
| 2004/0196871 A1* | 10/2004 | Terry | H04W 28/06 370/477 |
| 2006/0009229 A1* | 1/2006 | Yuan | H04W 72/14 455/452.1 |
| 2006/0056443 A1* | 3/2006 | Tao | H04W 28/06 370/462 |
| 2008/0186945 A1* | 8/2008 | Ahn | H04L 1/16 370/349 |
| 2009/0213815 A1* | 8/2009 | Sherman | H04W 74/0841 370/336 |
| 2010/0309871 A1 | 12/2010 | Fischer et al. | |
| 2012/0314673 A1 | 12/2012 | Noh et al. | |
| 2013/0003679 A1 | 1/2013 | Seok et al. | |
| 2013/0044607 A1* | 2/2013 | Liu | H04W 8/26 370/242 |
| 2013/0155976 A1* | 6/2013 | Chen | H04W 72/0453 370/329 |
| 2013/0235860 A1* | 9/2013 | Vermani | H04W 28/06 370/338 |
| 2013/0286959 A1* | 10/2013 | Lou | H04W 72/04 370/329 |
| 2013/0315219 A1* | 11/2013 | Cheong | H04W 28/16 370/338 |
| 2014/0029560 A1* | 1/2014 | Kim | H04L 5/001 370/329 |
| 2014/0071956 A1* | 3/2014 | Park | H04W 72/0406 370/336 |
| 2014/0071959 A1* | 3/2014 | Ghosh | H04W 72/0426 370/336 |
| 2014/0071996 A1* | 3/2014 | Tetzlaff | H04L 1/0031 370/474 |
| 2014/0079016 A1* | 3/2014 | Dai | H04L 5/0041 370/330 |
| 2014/0169245 A1* | 6/2014 | Kenney | H04L 27/2613 370/311 |
| 2014/0269628 A1* | 9/2014 | Ghosh | H04W 74/04 370/336 |
| 2014/0328195 A1 | 11/2014 | Sampath et al. | |
| 2015/0139209 A1* | 5/2015 | Park | H04W 74/08 370/338 |
| 2015/0249529 A1* | 9/2015 | Zheng | H04L 1/1685 370/336 |

FOREIGN PATENT DOCUMENTS

| | | |
|---|---|---|
| WO | WO-2010095802 A1 | 8/2010 |
| WO | WO-2011060310 A1 | 5/2011 |
| WO | WO-2012064502 A1 | 5/2012 |

OTHER PUBLICATIONS

Hart B. et al., "DL-OFDMA for Mixed Clients, 11-10-0317-00-00ac-dl-ofdma-for-mixed-clients", IEEE Draft, 11-10-0317-00-00AC-Dl-OFDMA-For-Mixed-Clients, IEEE-SA Mentor, Piscataway, NJ USA, vol. 802 .Ilac, Mar. 13, 2010 (Mar. 13, 2010), pp. 1-24, XP017677328, [retrieved on Mar. 13, 2010].

International Search Report and Written Opinion—PCT/US2014/036422—ISA/EPO—Oct. 23, 2014.

Partial International Search Report—PCT/US2014/036422—ISA/EPO—Aug. 18, 2014.

* cited by examiner

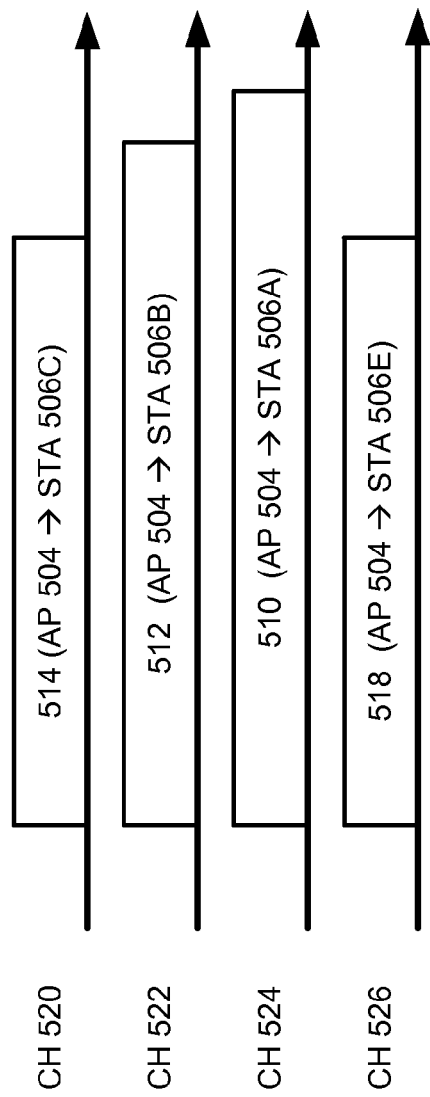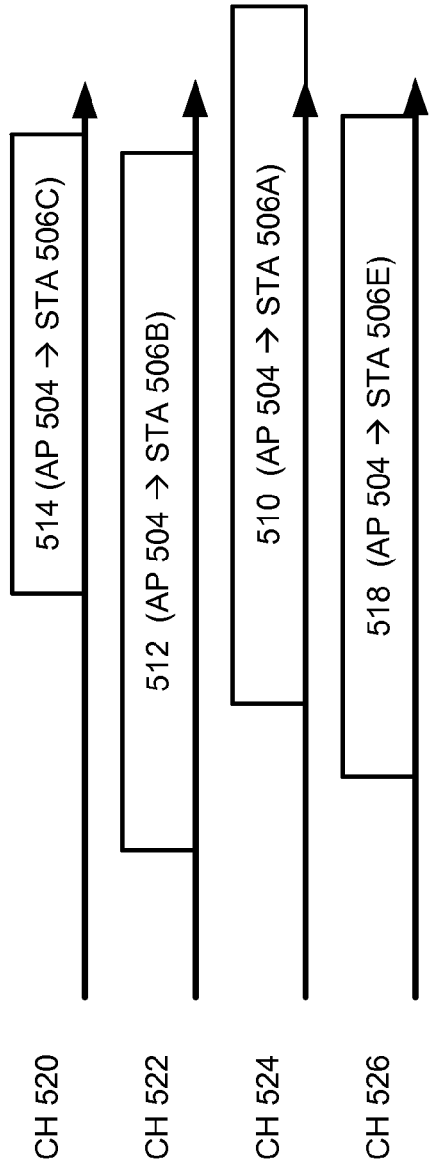

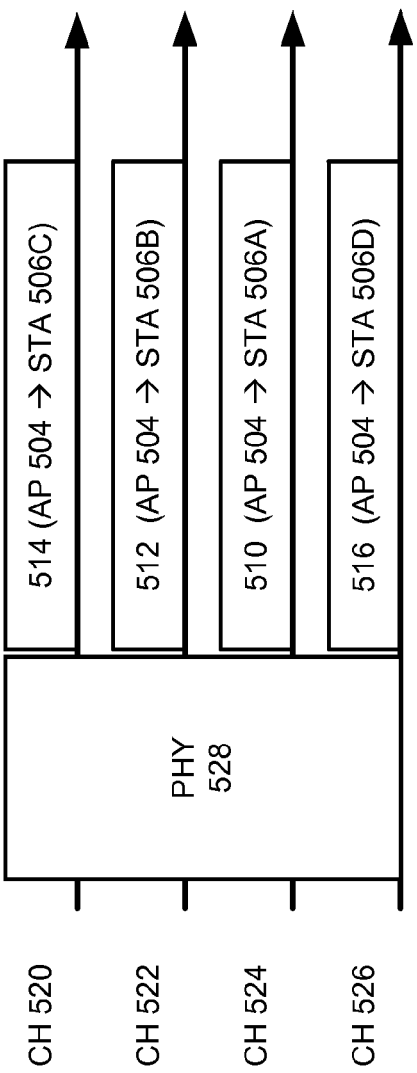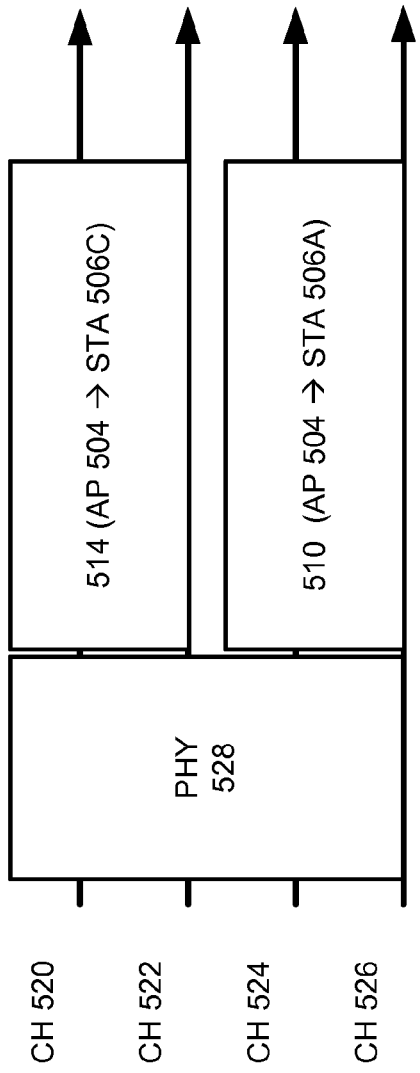

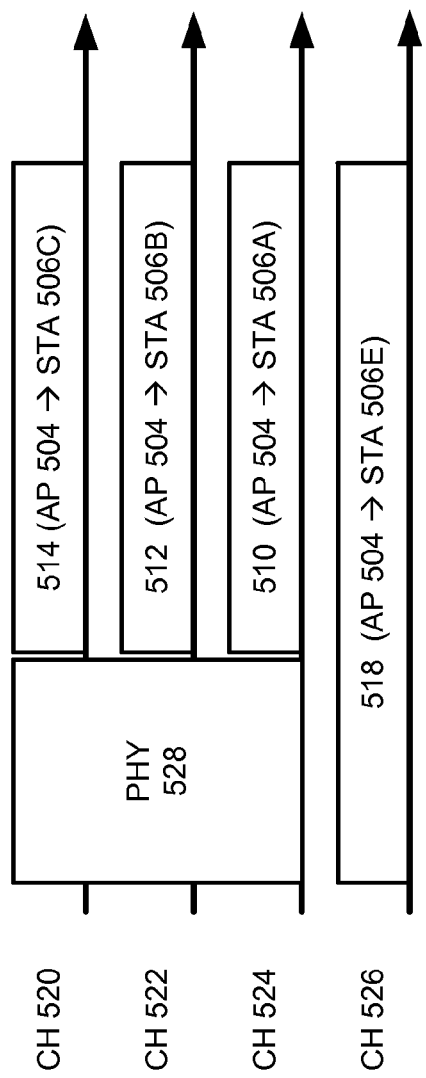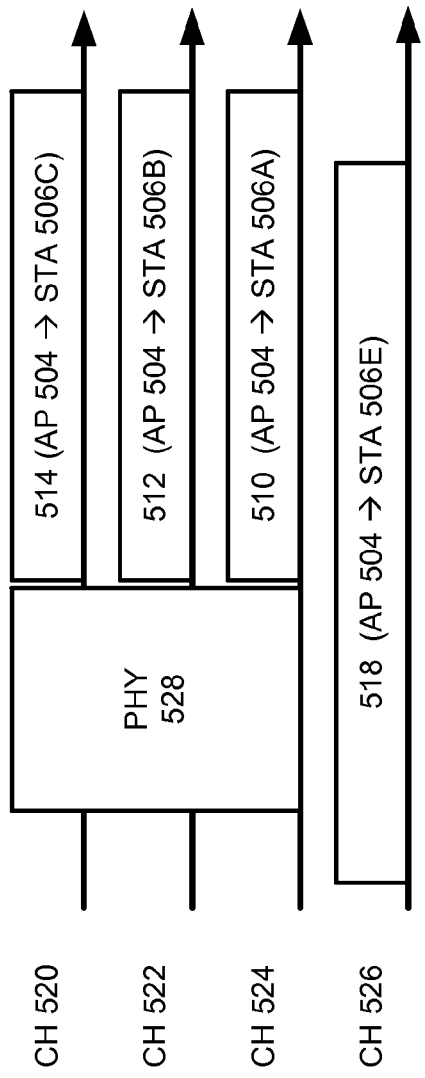

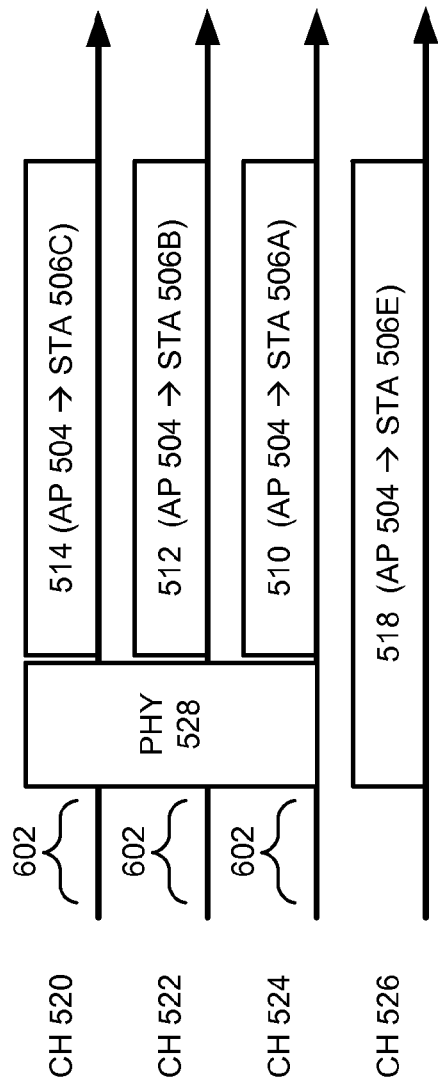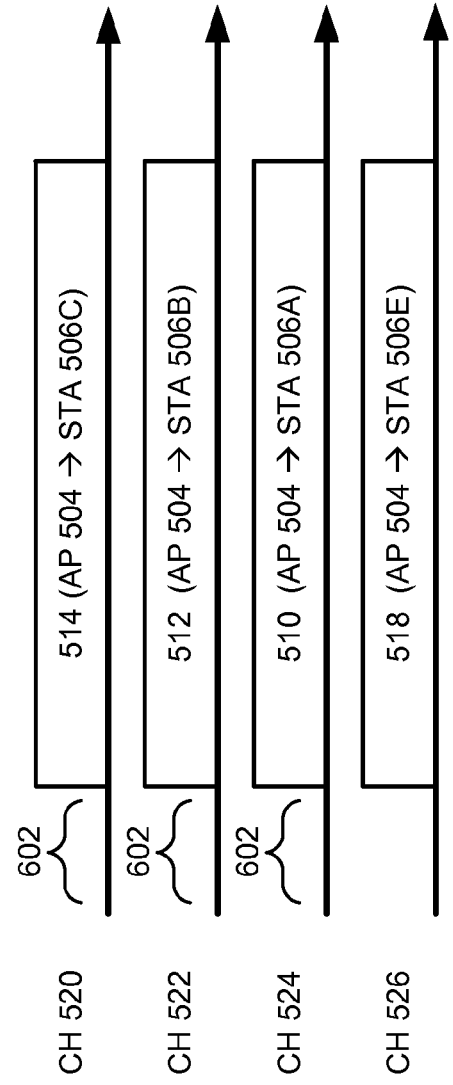

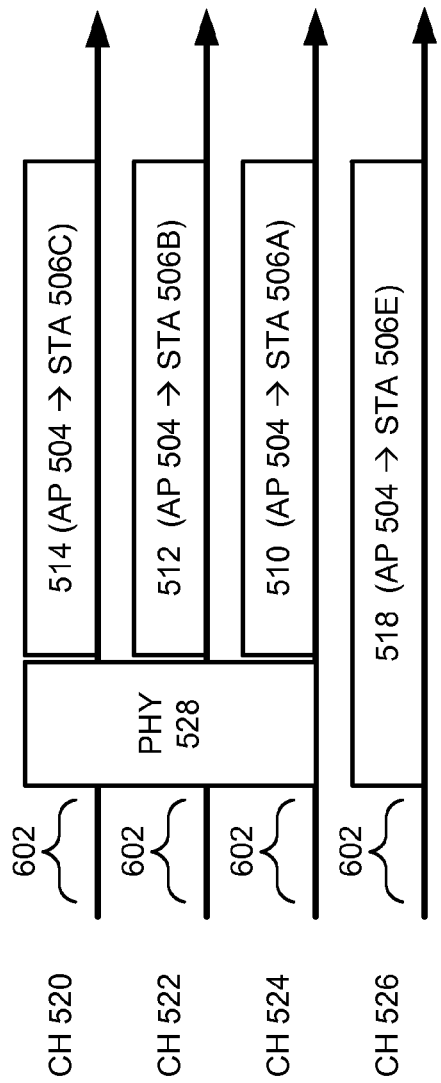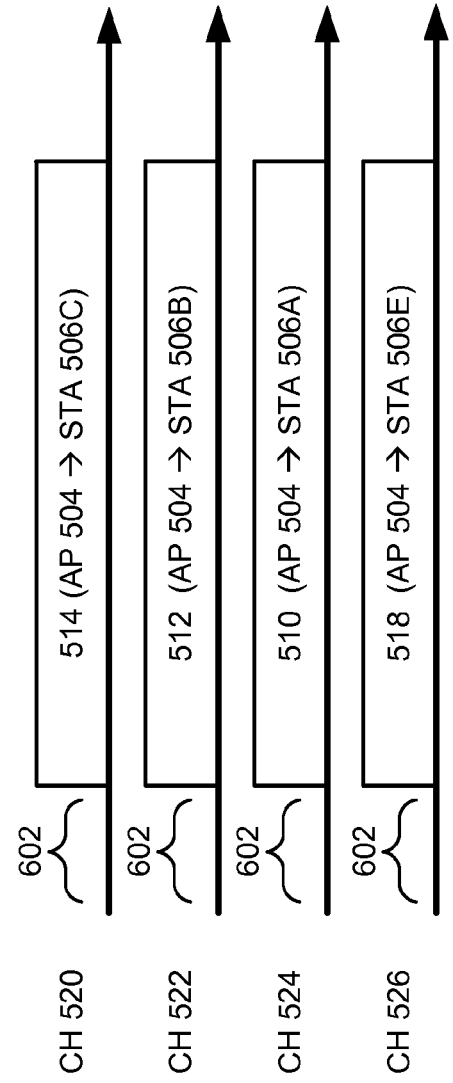

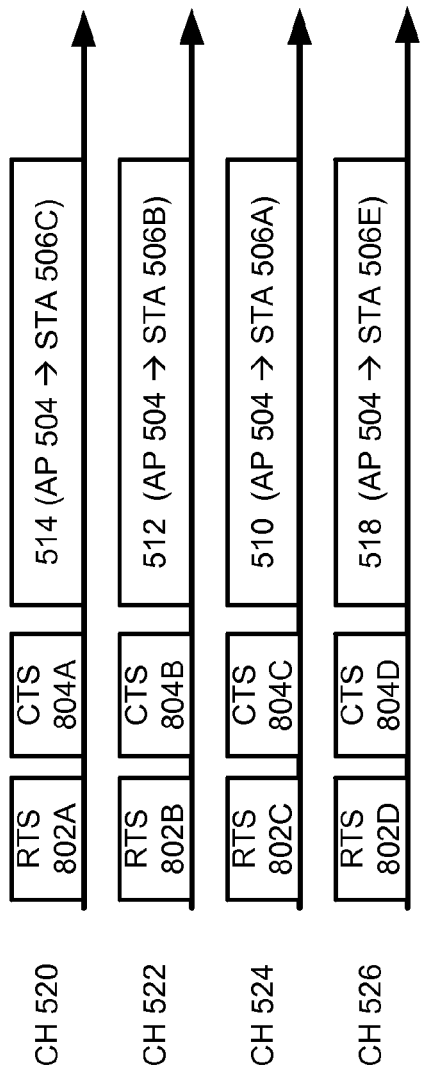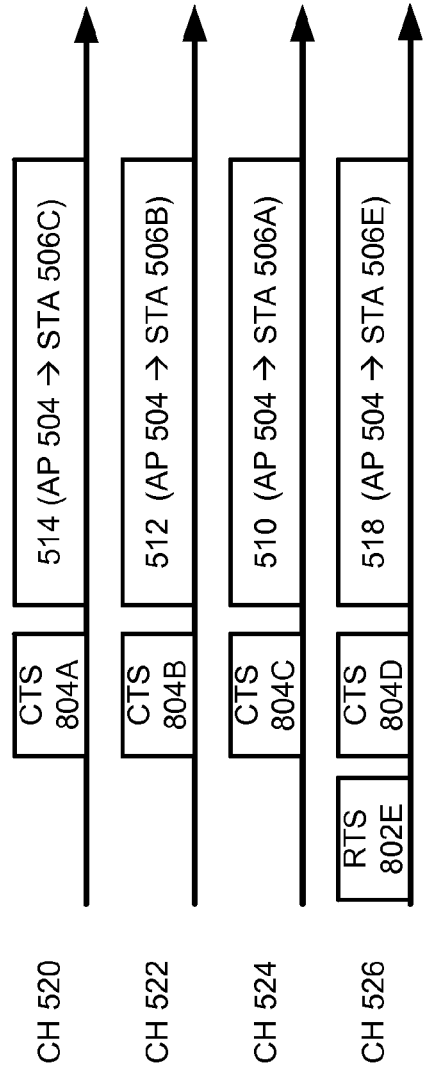
FIG. 8A
FIG. 8B

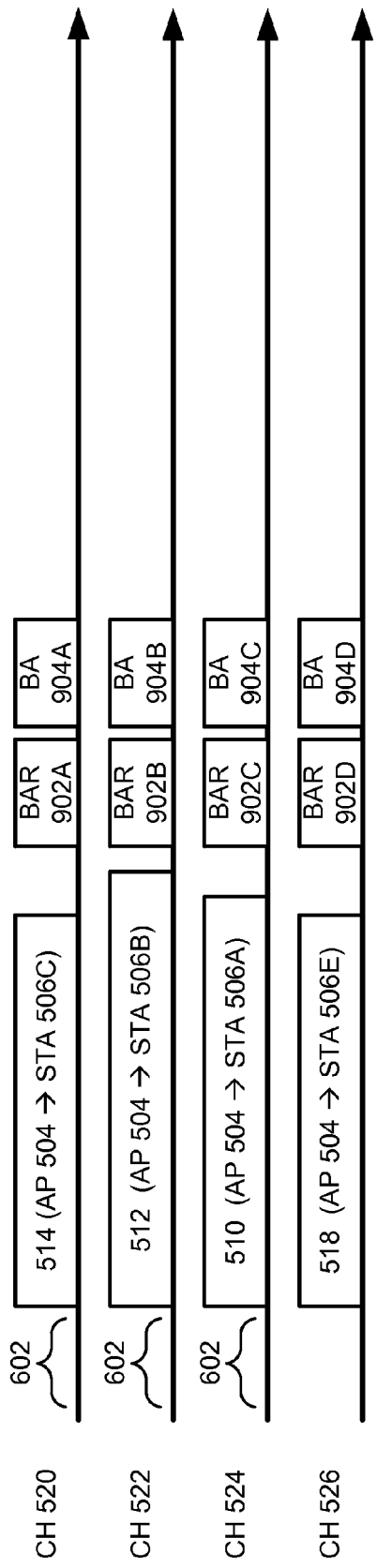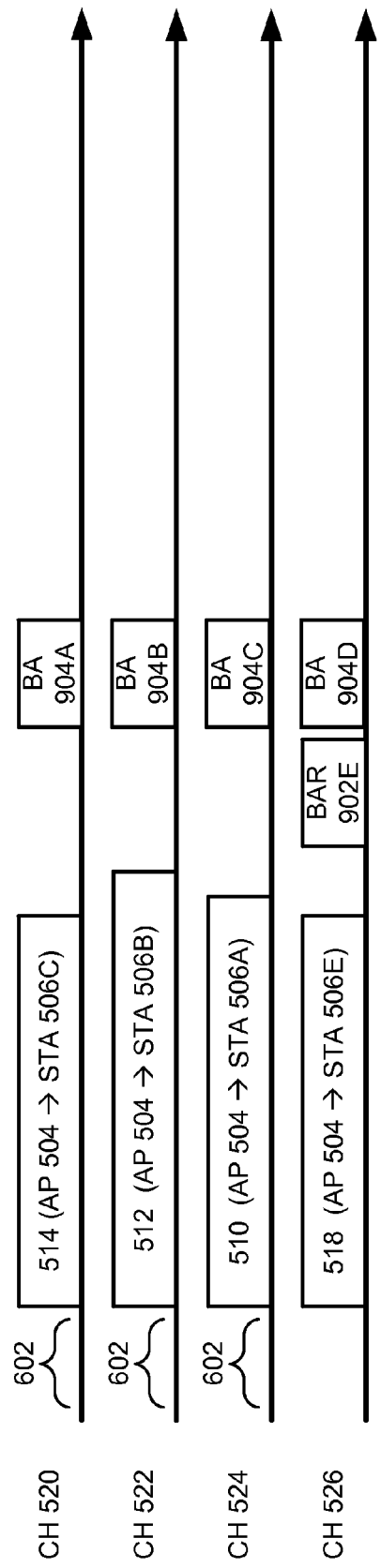

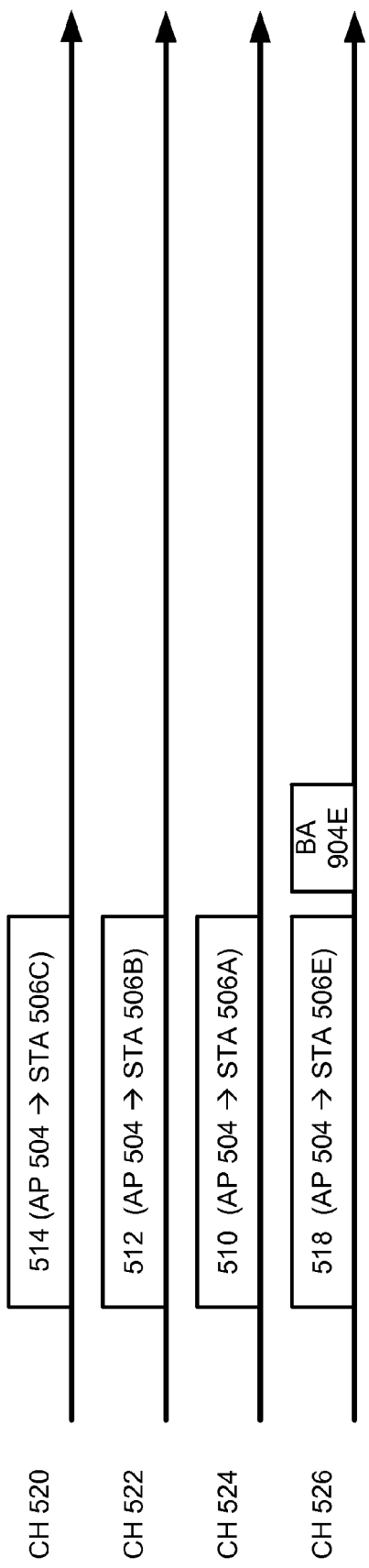

SYSTEMS AND METHODS FOR DOWNLINK FREQUENCY DOMAIN MULTIPLEXING TRANSMISSIONS

CROSS-REFERENCE TO RELATED APPLICATIONS

This application claims priority under 35 U.S.C. §119(e) to U.S. Provisional Application No. 61/819,109, entitled "SYSTEMS AND METHODS FOR DOWNLINK FREQUENCY DOMAIN MULTIPLEXING TRANSMISSIONS" and filed on May 3, 2013, which is hereby incorporated by reference in its entirety.

BACKGROUND

Field

The present application relates generally to wireless communications, and more specifically to systems, methods, and devices for downlink frequency domain multiplexing in wireless networks.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

However, multiple wireless networks may exist in the same building, in nearby buildings, and/or in the same outdoor area. The prevalence of multiple wireless networks may cause interference, reduced throughput (e.g., because each wireless network is operating in the same area and/or spectrum), and/or prevent certain devices from communicating. Thus, improved systems, methods, and devices for communicating when wireless networks are densely populated is desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of this disclosure provides a method for transmitting data. The method comprises generating a first message. The first message may comprise an allocation of a first station to a first frequency channel and a second station to a second frequency channel. The method further comprises transmitting the first message over the first frequency channel and the second frequency channel. The method further comprises transmitting, after transmission of the first message, a second message to the first station using the first frequency channel. The method further comprises transmitting, after transmission of the first message, a third message to the second station using the second frequency channel.

Another aspect of this disclosure provides an apparatus for transmitting data. The apparatus comprises means for generating a first message. The first message may comprise an allocation of a first station to a first frequency channel and a second station to a second frequency channel. The apparatus further comprises means for transmitting the first message over the first frequency channel and the second frequency channel. The apparatus further comprises means for transmitting, after transmission of the first message, a second message to the first station using the first frequency channel. The apparatus further comprises means for transmitting, after transmission of the first message, a third message to the second station using the second frequency channel.

Another aspect of this disclosure provides a non-transitory computer-readable medium comprising code that, when executed, causes an apparatus to generate a first message. The first message may comprise an allocation of a first station to a first frequency channel and a second station to a second frequency channel. The medium further comprises code that, when executed, causes an apparatus to transmit the first message over the first frequency channel and the second frequency channel. The medium further comprises code that, when executed, causes an apparatus to transmit, after transmission of the first message, a second message to the first station using the first frequency channel. The medium further comprises code that, when executed, causes an apparatus to transmit, after transmission of the first message, a third message to the second station using the second frequency channel.

Another aspect of this disclosure provides an apparatus for transmitting data. The apparatus comprises a processor configured to generate a first message. The first message may comprise an allocation of a first station to a first frequency channel and a second station to a second frequency channel. The apparatus further comprises a transmitter configured to transmit the first message over the first frequency channel and the second frequency channel. The transmitter may be further configured to transmit, after transmission of the first message, a second message to the first station using the first frequency channel. The transmitter may be further configured to transmit, after transmission of the first message, a third message to the second station using the second frequency channel.

Another aspect of this disclosure provides a method for transmitting data. The method comprises generating a first packet for transmission to a first station over a primary frequency channel. The method comprises generating a second packet. The second packet may comprise a physical layer preamble. The physical layer preamble may comprise an allocation of a second station to a secondary frequency channel and a third station to a ternary frequency channel. The method further comprises transmitting the first packet over the primary frequency channel to the first station. The first station may not be configured to communicate over the secondary frequency channel or the ternary frequency channel. The method further comprises transmitting the second packet over the secondary frequency channel and the ternary frequency channel. The method further comprises transmitting, after transmission of the second packet, a third packet to the second station using the secondary frequency channel. The method further comprises transmitting, after transmission of the second packet, a fourth packet to the third station using the ternary frequency channel.

Another aspect of this disclosure provides an apparatus for transmitting data. The apparatus comprises means for generating a first packet for transmission to a first station over a primary frequency channel. The apparatus further comprises means for generating a second packet. The second packet may comprise a physical layer preamble. The physical layer preamble may comprise an allocation of a second station to a secondary frequency channel and a third station to a ternary frequency channel. The apparatus further comprises means for transmitting the first packet over the primary frequency channel to the first station. The first station may not be configured to communicate over the secondary frequency channel or the ternary frequency channel. The apparatus further comprises means for transmitting the second packet over the secondary frequency channel and the ternary frequency channel. The apparatus further comprises means for transmitting, after transmission of the second packet, a third packet to the second station using the secondary frequency channel. The apparatus further comprises means for transmitting, after transmission of the second packet, a fourth packet to the third station using the ternary frequency channel.

Another aspect of this disclosure provides a non-transitory computer-readable medium comprising code that, when executed, causes an apparatus to generate a first packet for transmission to a first station over a primary frequency channel. The medium further comprises code that, when executed, causes an apparatus to generate a second packet. The second packet may comprise a physical layer preamble. The physical layer preamble may comprise an allocation of a second station to a secondary frequency channel and a third station to a ternary frequency channel. The medium further comprises code that, when executed, causes an apparatus to transmit the first packet over the primary frequency channel to the first station. The first station may not be configured to communicate over the secondary frequency channel or the ternary frequency channel. The medium further comprises code that, when executed, causes an apparatus to transmit the second packet over the secondary frequency channel and the ternary frequency channel. The medium further comprises code that, when executed, causes an apparatus to transmit, after transmission of the second packet, a third packet to the second station using the secondary frequency channel. The medium further comprises code that, when executed, causes an apparatus to transmit, after transmission of the second packet, a fourth packet to the third station using the ternary frequency channel.

Another aspect of this disclosure provides an apparatus for transmitting data. The apparatus comprises a processor configured to generate a first packet for transmission to a first station over a primary frequency channel. The processor may be further configured to generate a second packet. The second packet may comprise a physical layer preamble. The physical layer preamble may comprise an allocation of a second station to a secondary frequency channel and a third station to a ternary frequency channel. The apparatus further comprises a transmitter configured to transmit the first packet over the primary frequency channel to the first station. The first station may not be configured to communicate over the secondary frequency channel or the ternary frequency channel. The transmitter may be further configured to transmit the second packet over the secondary frequency channel and the ternary frequency channel. The transmitter may be further configured to transmit, after transmission of the second packet, a third packet to the second station using the secondary frequency channel. The transmitter may be further configured to transmit, after transmission of the second packet, a fourth packet to the third station using the ternary frequency channel.

Another aspect of this disclosure provides a method for transmitting data. The method comprises operating a random backoff counter associated with a primary frequency channel. The method comprises transmitting a first data packet over the primary frequency channel to a first station after the random backoff counter expires. The method comprises determining, after the random backoff counter expires, whether a secondary frequency channel has been idle for a duration of time based on a time interval before a time that the random backoff counter expired. The method further comprises transmitting a second data packet over the secondary frequency channel to a second station if the secondary frequency channel has been idle for the duration of time based on the time interval before the time that the random backoff counter expired.

Another aspect of this disclosure provides an apparatus for transmitting data. The apparatus comprises means for operating a random backoff counter associated with a primary frequency channel. The apparatus further comprises means for transmitting a first data packet over the primary frequency channel to a first station after the random backoff counter expires. The apparatus further comprises means for determining, after the random backoff counter expires, whether a secondary frequency channel has been idle for a duration of time based on a time interval before a time that the random backoff counter expired. The apparatus further comprises means for transmitting a second data packet over the secondary frequency channel to a second station if the secondary frequency channel has been idle for the duration of time based on the time interval before the time that the random backoff counter expired.

Another aspect of this disclosure provides a non-transitory computer-readable medium comprising code that, when executed, causes an apparatus to operate a random backoff counter associated with a primary frequency channel. The medium further comprises code that, when executed, causes an apparatus to transmit a first data packet over the primary frequency channel to a first station after the random backoff counter expires. The medium further comprises code that, when executed, causes an apparatus to determine, after the random backoff counter expires, whether a secondary frequency channel has been idle for a duration of time based on a time interval before a time that the random backoff counter expired. The medium further comprises code that, when executed, causes an apparatus to transmit a second data packet over the secondary frequency channel to a second station if the secondary frequency channel has been idle for the duration of time based on the time interval before the time that the random backoff counter expired.

Another aspect of this disclosure provides an apparatus for transmitting data. The apparatus comprises a processor configured to operate a random backoff counter associated with a primary frequency channel. The apparatus further comprises a transmitter configured to transmit a first data packet over the primary frequency channel to a first station after the random backoff counter expires. The apparatus further comprises a signal detector configured to determine, after the random backoff counter expires, whether a secondary frequency channel has been idle for a duration of time based on a time interval before a time that the random backoff counter expired. The transmitter may be further configured to transmit a second data packet over the secondary frequency channel to a second station if the secondary frequency channel has been idle for the duration of time based on the time interval before the time that the random backoff counter expired.

Another aspect of this disclosure provides a method for transmitting data. The method comprises transmitting a request to send message to a first station and a second station. The method further comprises receiving at least one clear to send message from at least one of the first station or the second station. The method further comprises transmitting, in response to reception of a clear to send message from the first station over a primary frequency channel, a first data packet to the first station over the primary frequency channel. The method further comprises transmitting, in response to reception of a clear to send message from the second station over a secondary frequency channel, a second data packet to the second station over the secondary frequency channel.

Another aspect of this disclosure provides an apparatus for transmitting data. The apparatus comprises means for transmitting a request to send message to a first station and a second station. The apparatus further comprises means for receiving at least one clear to send message from at least one of the first station or the second station. The apparatus further comprises means for transmitting, in response to reception of a clear to send message from the first station over a primary frequency channel, a first data packet to the first station over the primary frequency channel. The apparatus further comprises means for transmitting, in response to reception of a clear to send message from the second station over a secondary frequency channel, a second data packet to the second station over the secondary frequency channel.

Another aspect of this disclosure provides a non-transitory computer-readable medium comprising code that, when executed, causes an apparatus to transmit a request to send message to a first station and a second station. The medium further comprises code that, when executed, causes an apparatus to receive at least one clear to send message from at least one of the first station or the second station. The medium further comprises code that, when executed, causes an apparatus to transmit, in response to reception of a clear to send message from the first station over a primary frequency channel, a first data packet to the first station over the primary frequency channel. The medium further comprises code that, when executed, causes an apparatus to transmit, in response to reception of a clear to send message from the second station over a secondary frequency channel, a second data packet to the second station over the secondary frequency channel.

Another aspect of this disclosure provides an apparatus for transmitting data. The apparatus comprises a transmitter configured to transmit a request to send message to a first station and a second station. The apparatus further comprises a receiver configured to receive at least one clear to send message from at least one of the first station or the second station. The transmitter may be further configured to transmit, in response to reception of a clear to send message from the first station over a primary frequency channel, a first data packet to the first station over the primary frequency channel. The transmitter may be further configured to transmit, in response to reception of a clear to send message from the second station over a secondary frequency channel, a second data packet to the second station over the secondary frequency channel.

BRIEF DESCRIPTION OF THE DRAWINGS

FIGS. 5B-C show a timing diagram in which aspects of the present disclosure may be employed.

FIGS. 5D-E show another timing diagram in which aspects of the present disclosure may be employed.

FIGS. 5F-G show another timing diagram in which aspects of the present disclosure may be employed.

FIGS. 6A-B show another timing diagram in which aspects of the present disclosure may be employed.

FIGS. 6C-D show another timing diagram in which aspects of the present disclosure may be employed.

FIGS. 8A-C show another timing diagram in which aspects of the present disclosure may be employed.

FIGS. 9A-E shows another timing diagram in which aspects of the present disclosure may be employed.

DETAILED DESCRIPTION

Figure 1:
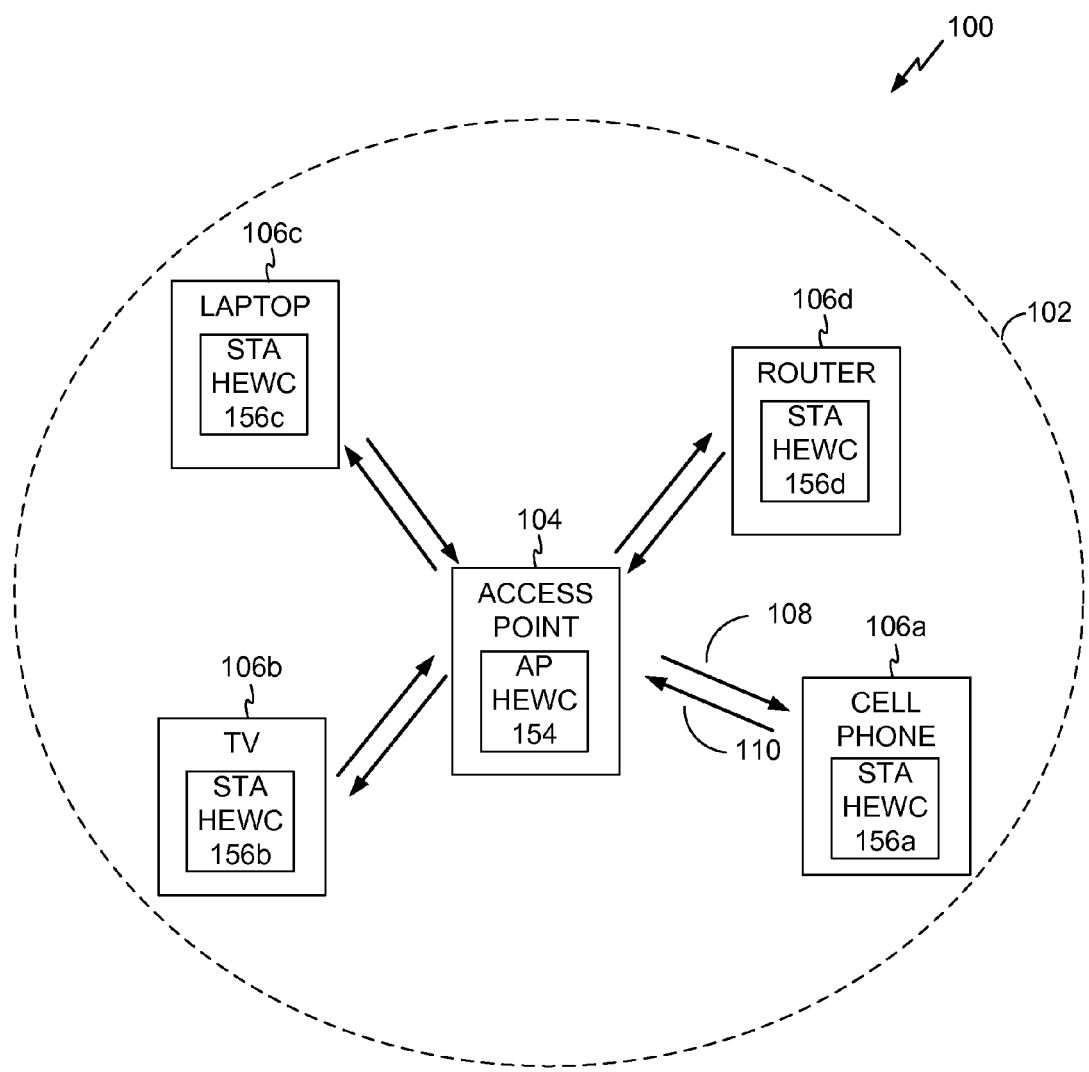
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing the high-efficiency 802.11 protocol using the techniques disclosed herein may include allowing for increased peer-to-peer services (e.g., Miracast, WiFi Direct Services, Social WiFi, etc.) in the same area, supporting increased per-user minimum throughput requirements, supporting more users, providing improved outdoor coverage and robustness, and/or consuming less power than devices implementing other wireless protocols.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement a high-efficiency 802.11 standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example a high-efficiency 802.11 standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with code division multiple access (CDMA) techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

In some aspects, a STA 106 may be required to associate with the AP 104 in order to send communications to and/or receive communications from the AP 104. In one aspect, information for associating is included in a broadcast by the AP 104. To receive such a broadcast, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

In an embodiment, the AP 104 includes an AP high-efficiency wireless component (HEWC) 154. The AP HEWC 154 may perform some or all of the operations described herein to enable communications between the AP 104 and the STAs 106 using the high-efficiency 802.11 protocol. The functionality of the AP HEWC 154 is described in greater detail below with respect to FIGS. 2B, 3, 4, 5A-G, 6A-D, 7, 8A-C, 9A-E, and 10-23.

Alternatively or in addition, the STAs 106 may include a STA HEWC 156. The STA HEWC 156 may perform some or all of the operations described herein to enable communications between the STAs 106 and the AP 104 using the high-frequency 802.11 protocol. The functionality of the STA HEWC 156 is described in greater detail below with respect to FIGS. 2B, 3, 4, and 5A.

Figure 2A:
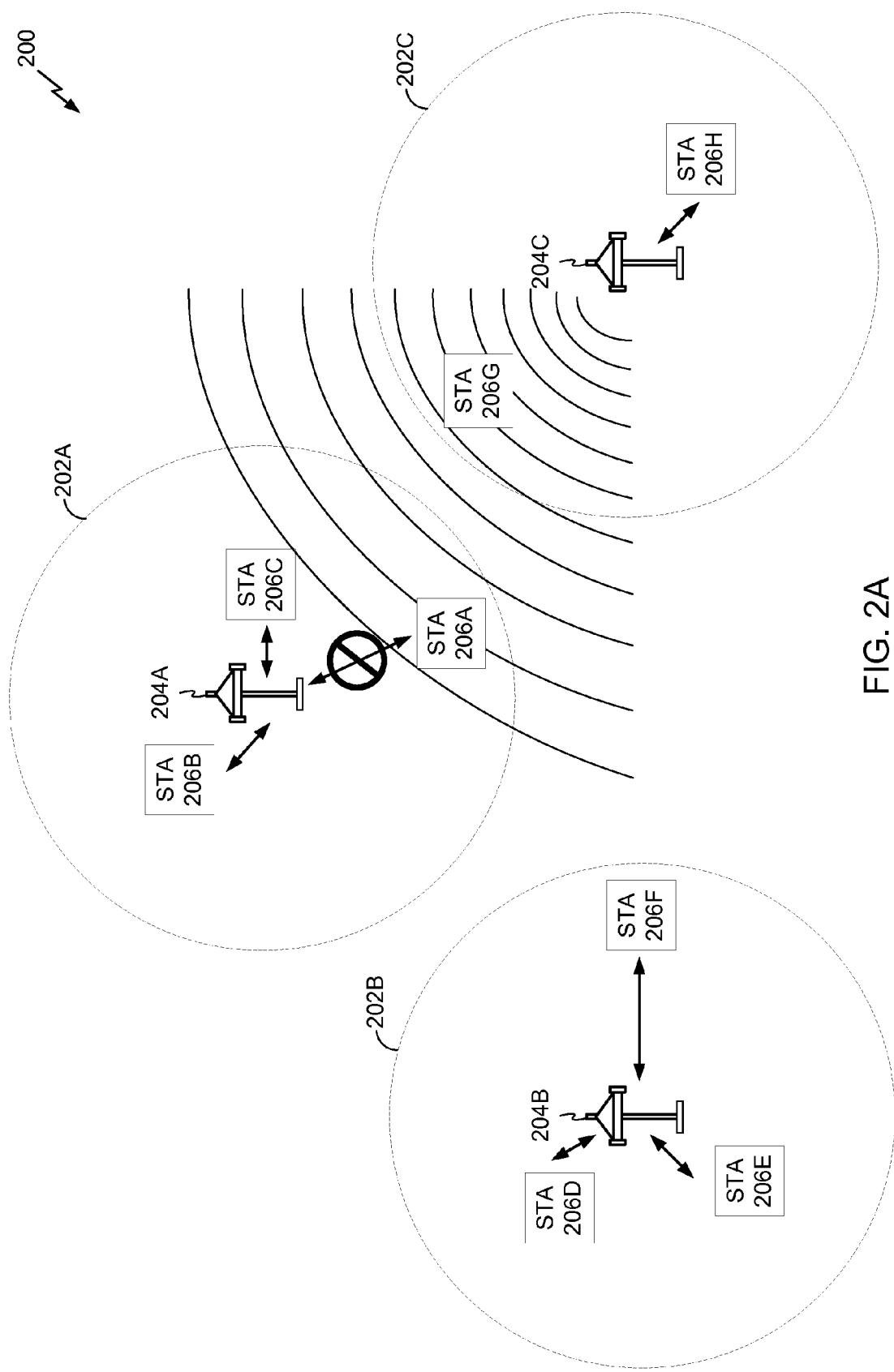
FIG. 2A shows a wireless communication system in which multiple wireless communication networks are present.

In some circumstances, a BSA may be located near other BSAs. For example, FIG. 2A shows a wireless communication system 200 in which multiple wireless communication networks are present. As illustrated in FIG. 2A, BSAs 202A, 202B, and 202C may be physically located near each other. Despite the close proximity of the BSAs 202A-C, the APs 204A-C and/or STAs 206A-H may each communicate using the same spectrum. Thus, if a device in the BSA 202C (e.g., the AP 204C) is transmitting data, devices outside the BSA 202C (e.g., APs 204A-B or STAs 206A-F) may sense the communication on the medium.

Generally, wireless networks that use a regular 802.11 protocol (e.g., 802.11a, 802.11b, 802.11g, 802.11n, etc.) operate under a carrier sense multiple access (CSMA) mechanism for medium access. According to CSMA, devices sense the medium and only transmit when the medium is sensed to be idle. Thus, if the APs 204A-C and/or STAs 206A-H are operating according to the CSMA mechanism and a device in the BSA 202C (e.g., the AP 204C) is transmitting data, then the APs 204A-B and/or STAs 206A-F outside of the BSA 202C may not transmit over the medium even though they are part of a different BSA.

FIG. 2A illustrates such a situation. As illustrated in FIG. 2A, AP 204C is transmitting over the medium. The transmission is sensed by STA 206G, which is in the same BSA 202C as the AP 204C, and by STA 206A, which is in a different BSA than the AP 204C. While the transmission may be addressed to the STA 206G and/or only STAs in the BSA 202C, STA 206A nonetheless may not be able to transmit or receive communications (e.g., to or from the AP 204A) until the AP 204C (and any other device) is no longer transmitting on the medium. Although not shown, the same may apply to STAs 206D-F in the BSA 202B and/or STAs 206B-C in the BSA 202A as well (e.g., if the transmission by the AP 204C is stronger such that the other STAs can sense the transmission on the medium).

The use of the CSMA mechanism then creates inefficiencies because some APs or STAs outside of a BSA may be able to transmit data without interfering with a transmission made by an AP or STA in the BSA. As the number of active wireless devices continues to grow, the inefficiencies may begin to significantly affect network latency and throughput. For example, significant network latency issues may appear in apartment buildings, in which each apartment unit may include an access point and associated stations. In fact, each apartment unit may include multiple access points, as a resident may own a wireless router, a video game console with wireless media center capabilities, a television with wireless media center capabilities, a cell phone that can act like a personal hot-spot, and/or the like. Correcting the inefficiencies of the CSMA mechanism may then be vital to avoid latency and throughput issues and overall user dissatisfaction.

Such latency and throughput issues may not even be confined to residential areas. For example, multiple access points may be located in airports, subway stations, and/or other densely-populated public spaces. Currently, WiFi access may be offered in these public spaces, but for a fee. If the inefficiencies created by the CSMA mechanism are not corrected, then operators of the wireless networks may lose customers as the fees and lower quality of service begin to outweigh any benefits.

Accordingly, the high-efficiency 802.11 protocol described herein may allow for devices to operate under a modified mechanism that minimizes these inefficiencies and increases network throughput. Such a mechanism is described below with respect to FIGS. 2B, 3, and 4. Additional aspects of the high-efficiency 802.11 protocol are described below with respect to FIGS. 5A-23.

Figure 2B:
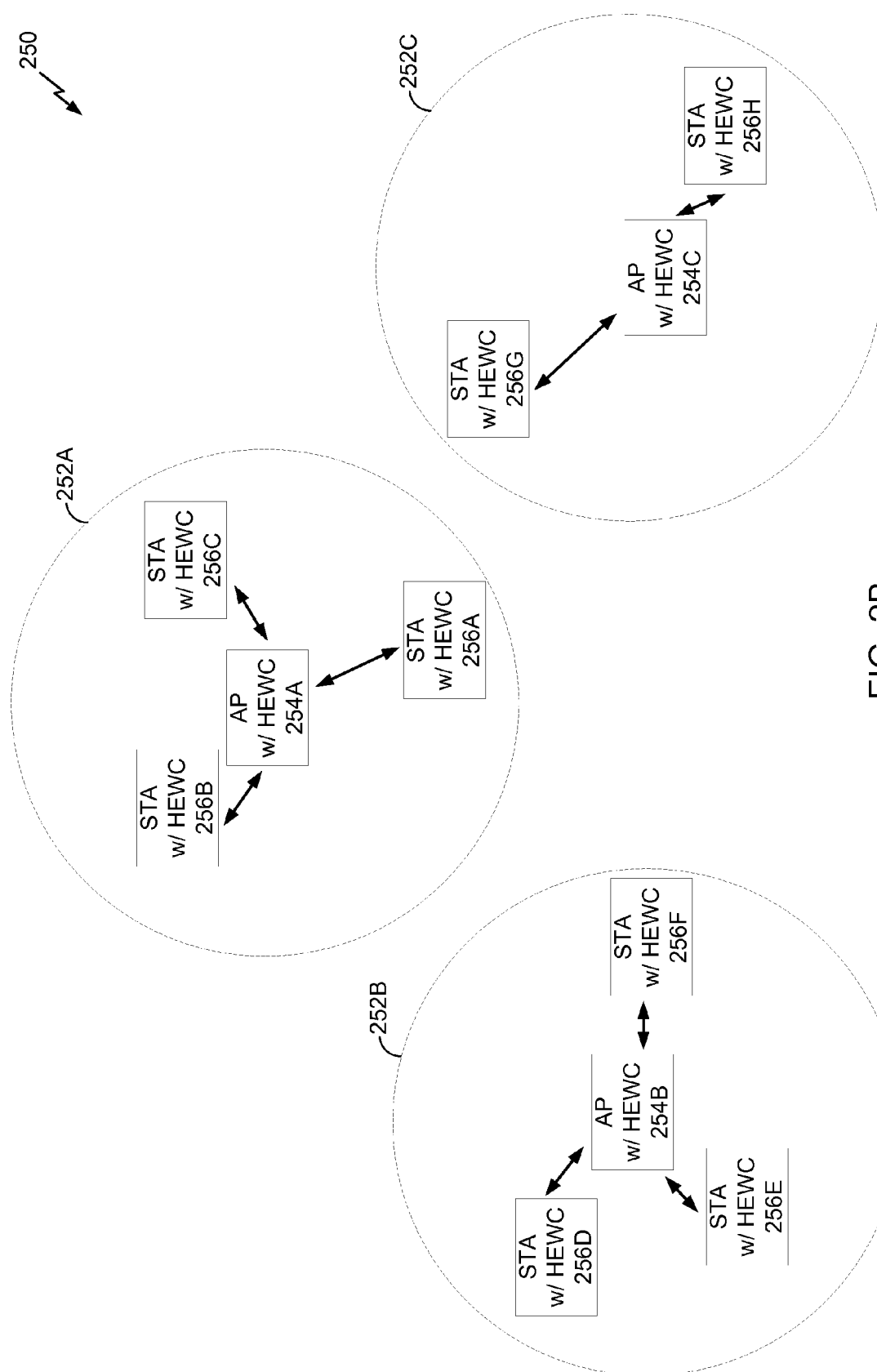
FIG. 2B shows another wireless communication system in which multiple wireless communication networks are present.

FIG. 2B shows a wireless communication system 250 in which multiple wireless communication networks are present. Unlike the wireless communication system 200 of FIG. 2A, the wireless communication system 250 may operate pursuant to the high-efficiency 802.11 standard discussed herein. The wireless communication system 250 may include an AP 254A, an AP 254B, and an AP 254C. The AP 254A may communicate with STAs 256A-C, the AP 254B may communicate with STAs 256D-F, and the AP 254C may communicate with STAs 256G-H.

A variety of processes and methods may be used for transmissions in the wireless communication system 250 between the APs 254A-C and the STAs 256A-H. For example, signals may be sent and received between the APs 254A-C and the STAs 256A-H in accordance with OFDM/OFDMA techniques or CDMA techniques.

The AP 254A may act as a base station and provide wireless communication coverage in a BSA 252A. The AP 254B may act as a base station and provide wireless communication coverage in a BSA 252B. The AP 254C may act as a base station and provide wireless communication coverage in a BSA 252C. It should be noted that each BSA 252A, 252B, and/or 252C may not have a central AP 254A, 254B, or 254C, but rather may allow for peer-to-peer communications between one or more of the STAs 256A-H. Accordingly, the functions of the AP 254A-C described herein may alternatively be performed by one or more of the STAs 256A-H.

In an embodiment, the APs 254A-C and/or STAs 256A-H include a high-efficiency wireless component. As described herein, the high-efficiency wireless component may enable communications between the APs and STAs using the high-efficiency 802.11 protocol. In particular, the high-efficiency wireless component may enable the APs 254A-C and/or STAs 256A-H to use a modified mechanism that minimizes the inefficiencies of the CSMA mechanism (e.g., enables concurrent communications over the medium in situations in which interference would not occur). The high-efficiency wireless component is described in greater detail below with respect to FIG. 4.

As illustrated in FIG. 2B, the BSAs 252A-C are physically located near each other. When, for example, AP 254A and STA 256B are communicating with each other, the communication may be sensed by other devices in BSAs 252B-C. However, the communication may only interfere with certain devices, such as STA 256F and/or STA 256G. Under CSMA, AP 254B would not be allowed to communicate with STA 256E even though such communication would not interfere with the communication between AP 254A and STA 256B. Thus, the high-efficiency 802.11 protocol operates under a modified mechanism that differentiates between devices that can communicate concurrently and devices that cannot communicate concurrently. Such classification of devices may be performed by the high-efficiency wireless component in the APs 254A-C and/or the STAs 256A-H. For example, an AP 254A-C can assign a STA 256A-H a particular classification (e.g., the AP 254A-C can assign a STA 256A-H a particular classification based on the bandwidth capabilities of the STA 256A-H). As another example, a STA 256A-H can choose a classification and notify the appropriate AP 254A-C. As another example, a STA 256A-H can submit, to the appropriate AP 254A-C, a request for a particular classification.

In an embodiment, the determination of whether a device can communicate concurrently with other devices is based on a location of the device. For example, a STA that is located near an edge of the BSA may be in a state or condition such that the STA cannot communicate concurrently with other devices. As illustrated in FIG. 2B, STAs 206A, 206F, and 206G may be devices that are in a state or condition in which they cannot communicate concurrently with other devices. Likewise, a STA that is located near the center of the BSA may be in a station or condition such that the STA can communicate with other devices. As illustrated in FIG. 2, STAs 206B, 206C, 206D, 206E, and 206H may be devices that are in a state or condition in which they can communicate concurrently with other devices.

In various embodiments, performance (e.g., RF) characteristics that affect the classification of a STA as being near the center of the BSA or near the edge of the BSA can include one or more of: a signal-to-interference-plus-noise ratio (SINR), an RF geometry, a received signal strength indicator (RSSI), a modulation and coding scheme (MCS) value, an interference level, a signal level, a transmission capability, and/or the like. In various embodiments, one or more physical and RF characteristics can be compared to one or more threshold levels. The comparisons can be weighted and/or combined. In various embodiments, devices can be determined to be in a condition such that they can or cannot communicate concurrently based on the solitary, weighted, and/or combined physical and RF characteristics and associated thresholds.

Note that the classification of devices is not permanent. Devices may transition between being in a state or condition such that they can communicate concurrently and being in a state or condition such that they cannot communicate concurrently (e.g., devices may change states or conditions when in motion, when associating with a new AP, when disassociating, etc.).

Furthermore, devices may be configured to behave differently based on whether they are ones that are or are not in a state or condition to communicate concurrently with other devices. For example, devices that are in a state or condition such that they can communicate concurrently may communicate within the same spectrum. However, devices that are in a state or condition such that they cannot communicate concurrently may employ certain techniques, such as spatial multiplexing or frequency domain multiplexing, in order to communicate over the medium. The controlling of the behavior of the devices may be performed by the high-efficiency wireless component in the APs 254A-C and/or the STAs 256A-H.

In an embodiment, devices that are in a state or condition such that they cannot communicate concurrently use spatial multiplexing techniques to communicate over the medium. For example, power and/or other information may be embedded within the preamble of a packet transmitted by another device. A device in a state or condition such that the device cannot communicate concurrently may analyze the preamble when the packet is sensed on the medium and decide whether or not to transmit based on a set of rules.

Figure 3:
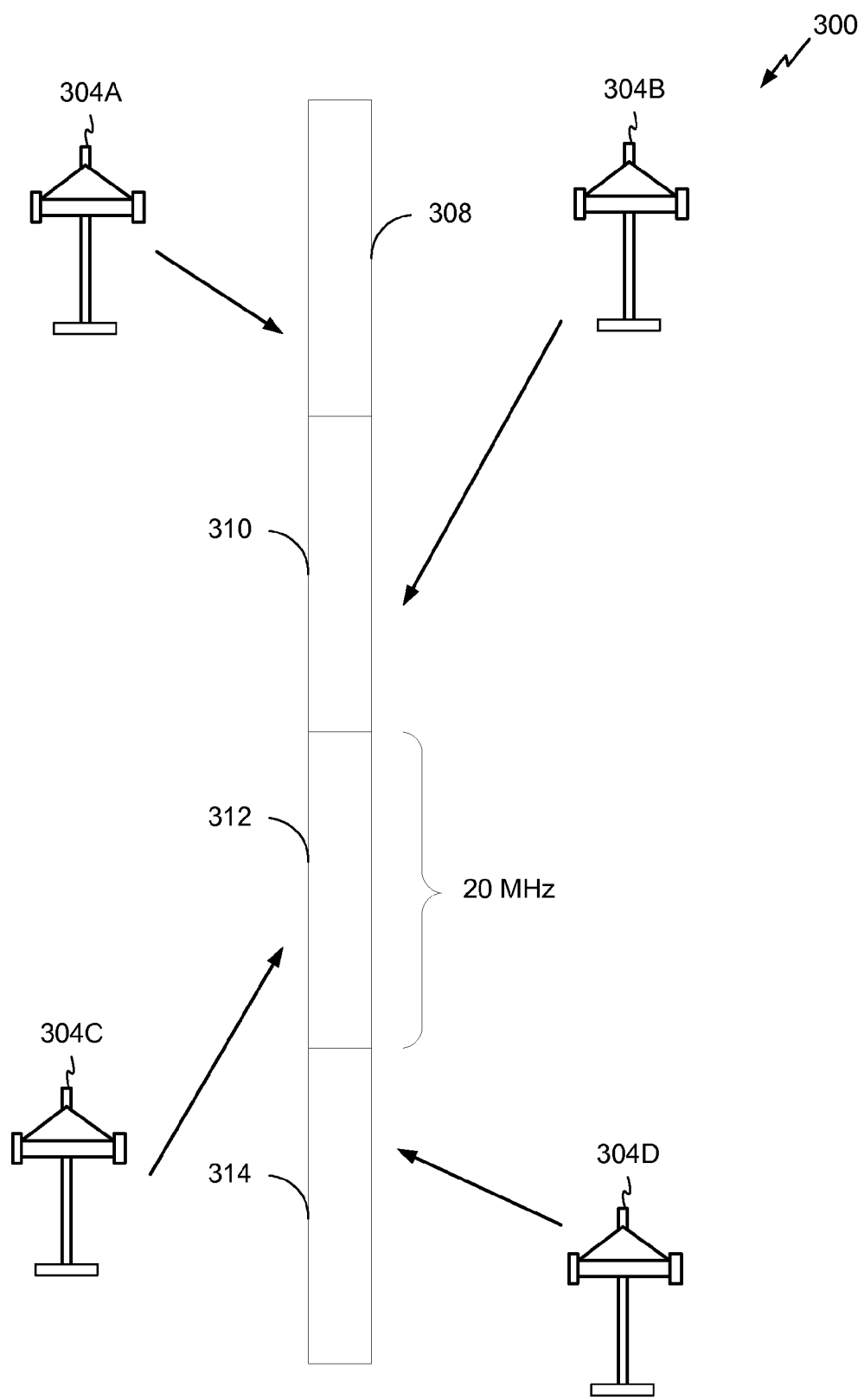
FIG. 3 shows frequency multiplexing techniques that may be employed within the wireless communication systems of FIGS. 1 and 2B.

In another embodiment, devices that are in a state or condition such that they cannot communicate concurrently use frequency domain multiplexing techniques to communicate over the medium. FIG. 3 shows frequency multiplexing techniques that may be employed within the wireless communication systems 100 of FIG. 1 and 250 of FIG. 2B. As illustrated in FIG. 3, an AP 304A, 304B, 304C, and 304D may be present within a wireless communication system 300. Each of the APs 304A, 304B, 304C, and 304D may be associated with a different BSA and include the high-efficiency wireless component described herein.

As an example, the bandwidth of the communication medium may be 80 MHz. Under the regular 802.11 protocol, each of the APs 304A, 304B, 304C, and 304D and the STAs associated with each respective AP attempt to communicate using the entire bandwidth, which can reduce throughput. However, under the high-efficiency 802.11 protocol using frequency domain multiplexing, the bandwidth may be divided into segments 308, 310, 312, and 314 (e.g., channels), as illustrated in FIG. 3. A channel may be any portion of the spectrum where IEEE 802.11 operation is allowed. Generally, a channel has a bandwidth of 20 MHz in legacy operations, but the channels or segments as described herein may be of any bandwidth, such as 5 MHz, 10 MHz, 20 MHz, etc. The channels or segments as described herein may also include a subset of non-adjacent tones within the bandwidth of a BSS. Furthermore, the channels or segments illustrated herein are depicted as being part of a contiguous chunk of spectrum (e.g., each channel or segment covers consecutive and neighboring frequency ranges); however, the channels or segments as described herein may be part of a contiguous or non-contiguous chunk of spectrum. The channels or segments can also be subsets of other channels or segments within the spectrum. As illustrated in FIG. 3, the AP 304A may be associated with segment 308, the AP 304B may be associated with segment 310, the AP 304C may be associated with segment 312, and the AP 304D may be associated with segment 314.

In an embodiment, when the APs 304A-D and the STAs that are in a state or condition such that the STAs can communicate concurrently with other devices (e.g., STAs near the center of the BSA) are communicating with each other, then each AP 304A-D and each of these STAs may communicate using a portion of or the entire 80 MHz medium. However, when the APs 304A-D and the STAs that are in a state or condition such that the STAs cannot communicate concurrently with other devices (e.g., STAs near the edge of the BSA) are communicating with each other, then AP 304A and its STAs communicate using 20 MHz segment 308, AP 304B and its STAs communicate using 20 MHz segment 310, AP 304C and its STAs communicate using 20 MHz segment 312, and AP 304D and its STAs communicate using 20 MHz segment 314. The APs 304A-D may communicate with each other (e.g., by transmitting and/or receiving coordination messages) to determine which APs and STAs communicate over which segments 308, 310, 312, and 314. Because the segments 308, 310, 312, and 314 are different portions of the communication medium, a first transmission using a first segment would not interference with a second transmission using a second segment.

Thus, APs and/or STAs, even those that are in a state or condition such that they cannot communicate concurrently with other devices, that include the high-efficiency wireless component can communicate concurrently with other APs and STAs without interference (e.g., concurrently by chance or concurrently based on a time scheduled by an AP or STA). Accordingly, the throughput of the wireless communication system 300 may be increased. In the case of apartment buildings or densely-populated public spaces, APs and/or STAs that use the high-efficiency wireless component may experience reduced latency and increased network throughput even as the number of active wireless devices increases, thereby improving user experience.

Figure 4:
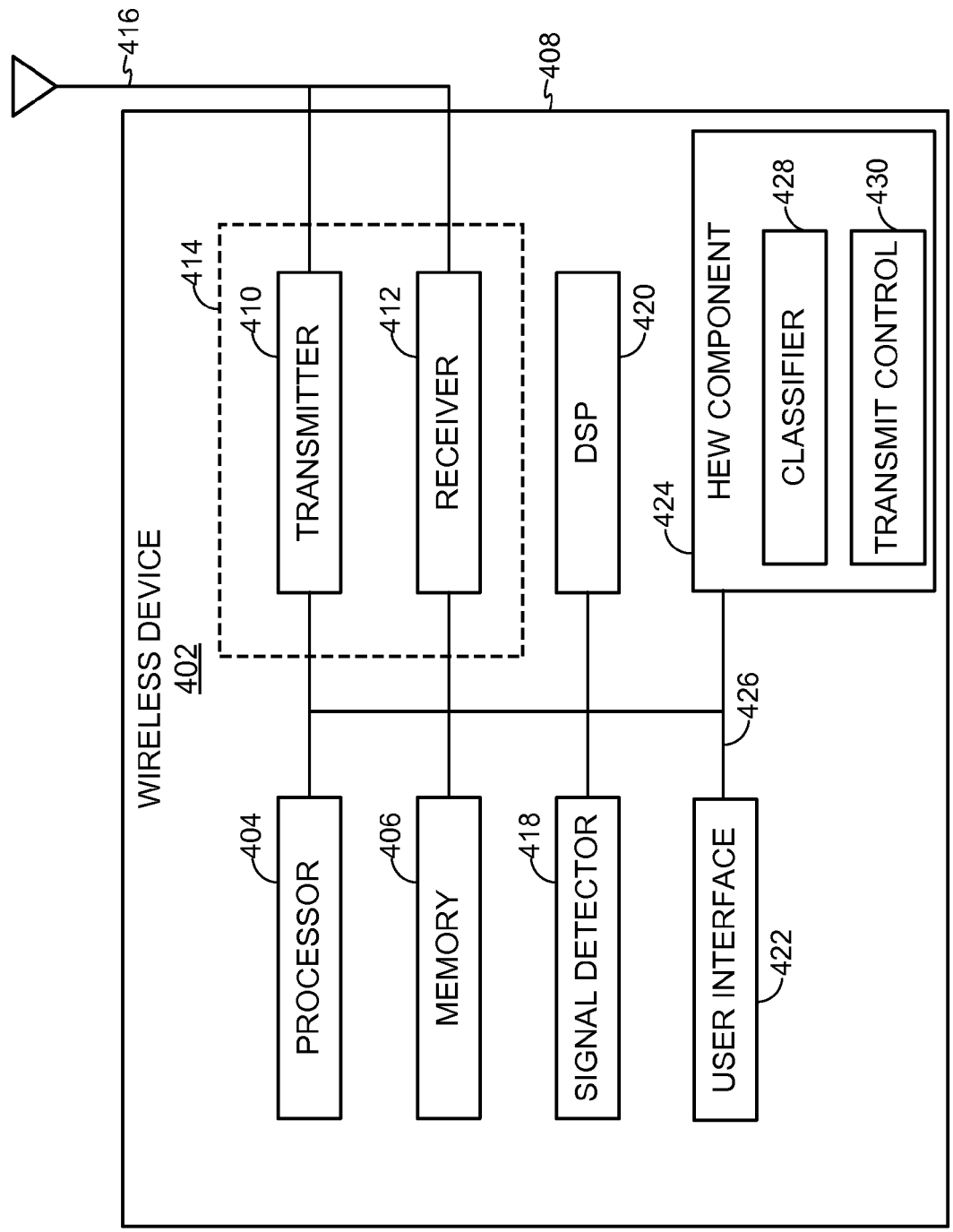
FIG. 4 shows a functional block diagram of an exemplary wireless device that may be employed within the wireless communication systems of FIGS. 1, 2B, and 3.

FIG. 4 shows an exemplary functional block diagram of a wireless device 402 that may be employed within the wireless communication systems 100, 250, and/or 300 of FIGS. 1, 2B, and 3. The wireless device 402 is an example of a device that may be configured to implement the various methods described herein. For example, the wireless device 402 may comprise the AP 104, one of the STAs 106, one of the APs 254, one of the STAs 256, and/or one of the APs 304.

The wireless device 402 may include a processor 404 which controls operation of the wireless device 402. The processor 404 may also be referred to as a central processing unit (CPU). Memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable to implement the methods described herein.

The processor 404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 402 may also include a housing 408 that may include a transmitter 410 and/or a receiver 412 to allow transmission and reception of data between the wireless device 402 and a remote location. The transmitter 410 and receiver 412 may be combined into a transceiver 414. An antenna 416 may be attached to the housing 408 and electrically coupled to the transceiver 414. The wireless device 402 may also include (not shown) multiple transmitters, multiple receivers, multiple transceivers, and/or multiple antennas.

The wireless device 402 may also include a signal detector 418 that may be used in an effort to detect and quantify the level of signals received by the transceiver 414. The signal detector 418 may detect such signals as total energy, energy per subcarrier per symbol, power spectral density and other signals. The wireless device 402 may also include a digital signal processor (DSP) 420 for use in processing signals. The DSP 420 may be configured to generate a packet for transmission. In some aspects, the packet may comprise a physical layer data unit (PPDU).

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user.

The wireless devices 402 may further comprise a high-efficiency wireless component 424 in some aspects. The high-efficiency wireless component 424 may include a classifier unit 428 and a transmit control unit 430. As described herein, the high-efficiency wireless component 424 may enable APs and/or STAs to use a modified mechanism that minimizes the inefficiencies of the CSMA mechanism (e.g., enables concurrent communications over the medium in situations in which interference would not occur).

The modified mechanism may be implemented by the classifier unit 428 and the transmit control unit 430. In an embodiment, the classifier unit 428 determines which devices are in a state or condition such that they can communicate concurrently with other devices and which devices are in a state or condition such that they cannot communicate concurrently with other devices. In an embodiment, the transmit control unit 430 controls the behavior of devices. For example, the transmit control unit 430 may allow certain devices to transmit concurrently on the same medium and allow other devices to transmit using a spatial multiplexing or frequency domain multiplexing technique. The transmit control unit 430 may control the behavior of devices based on the determinations made by the classifier unit 428.

The various components of the wireless device 402 may be coupled together by a bus system 426. The bus system 426 may include a data bus, for example, as well as a power bus, a control signal bus, and a status signal bus in addition to the data bus. Those of skill in the art will appreciate the components of the wireless device 402 may be coupled together or accept or provide inputs to each other using some other mechanism.

Although a number of separate components are illustrated in FIG. 4, those of skill in the art will recognize that one or more of the components may be combined or commonly implemented. For example, the processor 404 may be used to implement not only the functionality described above with respect to the processor 404, but also to implement the functionality described above with respect to the signal detector 418 and/or the DSP 420. Further, each of the components illustrated in FIG. 4 may be implemented using a plurality of separate elements.

The wireless device 402 may comprise an AP 104, a STA 106, an AP 254, a STA 256, and/or an AP 304, and may be used to transmit and/or receive communications. That is, either AP 104, STA 106, AP 254, STA 256, or AP 304 may serve as transmitter or receiver devices. Certain aspects contemplate signal detector 418 being used by software running on memory 406 and processor 404 to detect the presence of a transmitter or receiver.

As described above, network throughput and latency may be a major concern in wireless networks when the CSMA mechanism is used. For example, wireless devices associated with one wireless network may be located in close proximity to other wireless devices associated with other wireless networks. Wireless devices of one network may sense a transmission by another wireless device of another network, and thus refrain from transmitting over the medium, even when no interference would occur. Accordingly, a modified mechanism can be used in a high-efficiency 802.11 protocol to alleviate some of these issues.

In the modified mechanism, wireless devices may be classified according to a state or condition of the wireless device. For example, a wireless device may be in a state or condition in which the wireless device can communicate concurrently with other wireless devices (e.g., because the wireless device is located away from an edge of the BSA and thereby would not cause interference). As another example, a wireless device may be in a state or condition in which the wireless device cannot communicate concurrently with other wireless devices (e.g., because the wireless device is located near an edge of the BSA and thereby would cause interference).

In order to improve network throughput and reduce latency, some techniques may be employed to allow wireless devices to communicate concurrently even if they are near an edge of the BSA or otherwise cannot communicate concurrently under current protocols. One such technique is frequency domain multiplexing, which is described above with respect to FIG. 3. In particular, protocols may be developed and implemented to allow APs to transmit messages to STAs (e.g., DL communications) using frequency domain multiplexing techniques. As described below, an AP may transmit messages to a STA using a frequency channel determined based on how the STA is classified.

Figure 5A:
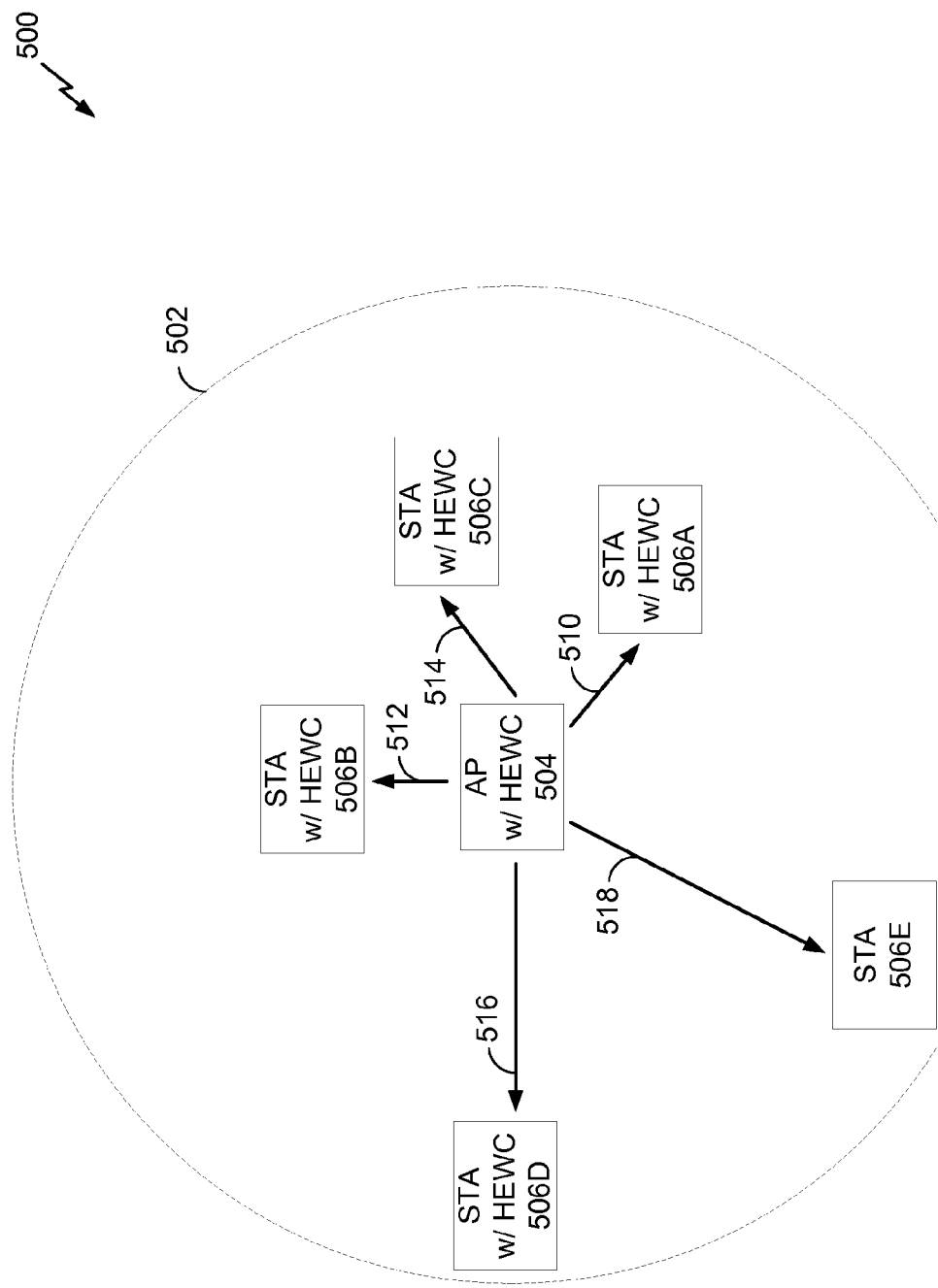
FIG. 5A shows a wireless communication system in which aspects of the present disclosure may be employed.

FIG. 5A shows a wireless communication system 500 in which aspects of the present disclosure may be employed. As illustrated in FIG. 5A, the wireless communication system 500 includes a BSA 502. The BSA 502 may include an AP 504 and STAs 506A-E. In an embodiment, the AP 504 and the STAs 506A-D each include the high-efficiency wireless component discussed above. However, the STA 506E does not include the high-efficiency wireless component. Thus, STAs 506A-D are referred to as high-efficiency STAs, whereas STA 506E is referred to as a legacy STA (e.g., because it is compatible with regular IEEE 802.11 protocols, such as IEEE 802.11n, IEEE 802.11ac, etc.).

As described above, the AP 504 may classify the high-efficiency STAs and the legacy STAs as being or not being in a state or condition in which the respective STA can communicate concurrently with other wireless devices. The AP 504 may make such a classification based on the respective bandwidth capabilities of the STA.

The AP 504 may transmit data to STA 506A via DL communication 510, to STA 506B via DL communication 512, to STA 506C via DL communication 514, to STA 506D via DL communication 516, and to STA 506E via DL communication 518. As illustrated in FIG. 5A, STAs 506A-C may be located closer to the AP 504 than STAs 506D-E. The DL communications 510, 512, 514, 516, and 518 may be made by the AP 504 according to the downlink frequency domain multiplexing (DL FDM) protocol described herein.

A DL FDM protocol may include three data exchange stages: (1) data transmission; (2) protection; and (3) acknowledgment. The protection stage may precede the data transmission stage and the acknowledgment stage may follow the data transmission stage. In the protection stage, techniques may be employed to prevent interference. In the data transmission stage, data for one or more STAs may be transmitted to the respective STAs. In the acknowledgment stage, the AP may confirm that the respective STAs received the appropriate data. Each of these stages may occur concurrently on different channels according to the frequency domain multiplexing principles discussed herein. In addition, the DL FDM protocol may include rules related to the timing of the start of transmissions by the AP 504.

Data Transmission Stage

In an embodiment, several data transmission options are available during the data transmission stage. In particular, several options are available for allocating STAs on different channels such that the STAs can communicate concurrently. These options may also allow for both legacy STAs and high-efficiency STAs to communicate concurrently. Thus, the techniques described herein to improve network throughput and reduce latency may be implemented in devices that are compatible with high-efficiency STAs and that are backwards compatible with existing legacy STAs. For example, an existing PHY layer of the regular IEEE 802.11 protocol (e.g., the 802.11n, 802.11ac, etc. PHY layer) may be coupled with a new media access control (MAC) mechanism to allocate STAs on different channels. As another example, a new PHY layer preamble may be created for the high-efficiency 802.11 protocol to allocate STAs on different channels. As another example, the existing PHY layer of the regular IEEE 802.11 protocol and the new PHY layer preamble may be used to allocate STAs on different channels.

FIGS. 5B-C show a timing diagram in which aspects of the present disclosure may be employed. In particular, FIGS. 5B-C show a timing diagram that may be used in accordance with the existing PHY layer of the regular IEEE 802.11 protocol and the new MAC mechanism. As illustrated in FIGS. 5B-C, four channels are present: channel 520, channel 522, channel 524, and channel 526. As used herein, channel 526 is referred to as a primary channel and channels 520, 522, and 524 are referred to as secondary channels. A primary channel is a default channel used by STAs operating on the regular IEEE 802.11 protocol. Legacy STAs may receive or transmit data using the secondary channels, but the transmission to or from the legacy STAs must include the primary channel (e.g., packets for a legacy STA always include the primary channel). A high-efficiency STA, on the other hand, may receive or transmit data using the primary channel or may receive or transmit data only using the secondary channels (e.g., as long as the transmission to or from the high-efficiency STA includes at least one channel known by the high-efficiency STA). The channels 520, 522, 524, and 526 may be contiguous (e.g., each channel 520, 522, 524, and 526 covers consecutive 20 MHz frequency ranges, such as from 1000 MHz to 1080 MHz) or non-contiguous (e.g., there are gaps in frequency between one or more of the channels 520, 522, 524, and/or 526).

In an embodiment, the primary channel (and potentially additional secondary channels, as in legacy IEEE 802.11n operation, legacy IEEE 802.11ac operation, etc.) is used for communications from the AP 504 to legacy STAs (e.g., STA 506E) and the secondary channels are used for communications from the AP 504 to the high-efficiency STAs (e.g., STAs 506A-D).

The AP 504 may transmit a MAC message that associates STAs 506A-E with channels, thereby indicating which channel the AP 504 plans to use to communicate with a respective STA 506A-E. In some embodiments, the AP 504 defaults to communicating with the STA 506E on the primary channel since the STA 506E is a legacy STA. Thus, the AP 504 may not transmit the MAC message to the STA 506E. Rather, the AP 504 may transmit the MAC message only to the high-efficiency STAs. In other embodiments, the AP 504 transmits the MAC message to each STA 506A-E. The MAC message may be a management frame transmitted by the AP 504 to the STAs 506A-E. The management frame may indicate the allocated channel(s) for one or more of the STAs 506A-E. The MAC message is described in greater detail below with respect to FIG. 7.

As illustrated in FIGS. 5B-C, the MAC message allocates STA 506E to channel 526, STA 506A to channel 524, STA 506B to channel 522, and STA 506C to channel 520. Transmissions from the AP 504 to the respective STAs 506A-C and 506E may begin at the same time (e.g., see FIG. 5B) or begin at different times (e.g., see FIG. 5C). If the transmissions from the AP 504 begin at different times, OFDM symbols transmitted to different STAs 506A-E may still be aligned to help receiver processing. Likewise, the transmissions from the AP 504 may end at the same time (not shown) or end at different times (e.g., see FIGS. 5B-C).

The STAs 506A-E may receive the MAC message and/or the actual data transmission using special filtering capabilities and/or an oversampled FFT. The legacy STA 506E and/or any other legacy STAs in the BSA 502 may include a low modulation and coding scheme (MCS) value (e.g., four or five) in order to minimize potential channel interference from adjacent channels.

Accordingly, use of the existing PHY layer and the new MAC mechanism allows the AP 504 to multiplex transmissions to legacy STAs and high-efficiency STAs concurrently or nearly concurrently.

FIGS. 5D-E show another timing diagram in which aspects of the present disclosure may be employed. In particular, FIGS. 5D-E show a timing diagram that may be used in accordance with the new PHY layer preamble. Since a new PHY layer preamble is defined, FIGS. 5D-E may apply only to high-efficiency STAs.

In an embodiment, the new PHY layer preamble includes an MCS associated with each STA 506A-D, a duration of time that the AP 504 will transmit to each respective STA 506A-D, a number of bytes that the AP 504 will transmit to each respective STA 506A-D, an identification of a channel associated with each respective STA 506A-D and the channel's bandwidth, a duration of time that legacy STAs should defer transmissions over the primary channel, additional indications on transmission modes (e.g., coding mode, pilot location mode, etc.) that will be used by the AP 504 when transmitting messages to each respective STA 506A-D, and/or any other physical layer transmission parameter. If the new PHY layer preamble does not include any of the above-mentioned information, such information may be included in a MAC message transmitted previously to the STA 506A-D.

The channel bandwidth may be the same or different for each STA 506A-D. For example, as illustrated in FIG. 5D, STAs 506A-D are assigned a separate channel 520, 522, 524, or 526, where each channel has the same bandwidth. As another example, as illustrated in FIG. 5E, STAs 506A and 506C are assigned a separate channel 522 or 526, where each channel has the same bandwidth and where the bandwidth is double the bandwidth as in FIG. 5D. As another example, not shown, STA 506A and 506C are assigned a separate channel 522 or 526, where the bandwidth of channel 522 is different than the bandwidth of channel 526 (e.g., the bandwidth of channel 522 is double the bandwidth of channel 526).

As illustrated in FIGS. 5D-E, a PHY layer preamble 528 is transmitted by the AP 504 over channels 520, 522, 524, and 526. In some embodiments, the PHY layer preamble 528 includes information for all the STAs 506A-D on each channel. This may allow a STA 506A-D to listen on any of the channels and receive the channel allocation information. In other embodiments, the PHY layer preamble 528 includes information for different STAs 506A-D in different channels. Here, a STA 506A-D may be informed a priori of the channel the STA 506A-D should be listening to via an additional MAC message. Each of the STAs 506A-D may listen for messages on a separate channel. In this way, each of the STAs 506A-D may receive the PHY layer preamble 528. After receiving the PHY layer preamble 528, the STAs 506A-D may receive the DL communication 510, 512, 514, or 516. The STAs 506A-D may use the information provided in the PHY layer preamble 528 to properly receive the DL communication from the AP 504 and/or to properly transmit UL communication to the AP 504. Accordingly, the AP 504 may be able to transmit data over multiple channels to multiple STAs 506A-D using the new PHY layer preamble 528. Note that the transmissions may be of the same or different duration on each channel.

FIGS. 5F-G show another timing diagram in which aspects of the present disclosure may be employed. In particular, FIGS. 5D-E show a timing diagram that may be used in accordance with the existing PHY layer in the regular IEEE 802.11 protocol and the new PHY layer preamble.

As described above with respect to FIGS. 5B-C, the primary channel (e.g., channel 526) and/or one or more of the secondary channels (e.g., channels 520, 522, and/or 524) may be used for transmissions to legacy STAs (e.g., STA 506E) and the secondary channels may be used for transmissions to high-efficiency STAs (e.g., STAs 506A-D). Since the new PHY layer preamble 528 is compatible with the high-efficiency STAs, the PHY layer preamble 528 may be transmitted over the secondary channels such that only the high-efficiency STAs receive the PHY layer preamble 528, as illustrated in FIGS. 5F-G.

In an embodiment, as described above, each of the channel bandwidths may be the same size or a different size. In an embodiment, the channels 520, 522, 524, and/or 526 may or may not be contiguous. In some embodiments, the primary channel is always used and associated with at least one STA 506A-E. In other embodiments, the primary channel is not used or associated with any of the STAs 506A-E.

Accordingly, use of the existing PHY layer and the new PHY layer preamble 528 allows the AP 504 to multiplex transmissions to legacy STAs and high-efficiency STAs concurrently or nearly concurrently. The new MAC mechanism may not be necessary in order to properly instruct STAs 506A-E to listen for messages on the appropriate channels; however, the new MAC mechanism may be used in connection with the existing PHY layer and the new PHY layer preamble 528.

In an embodiment, a (legacy) transmission on the primary channel may include or may be preceded by a MAC message, where the MAC message includes an indication of the presence of additional high-efficiency transmissions in one or more of the secondary channels. This may allow high-efficiency STAs to listen to the primary channel only and be notified of the presence of additional packets on the secondary channels that may be addressed to one or more of the high-efficiency STAs. High-efficiency STAs may then switch to the second channel and detect the preamble, where the preamble contains additional information for decoding the transmission.

Timing of Start Transmission

In an embodiment, the timing of the start of a transmission may be based on rules based on a random backoff counter and a point coordination function inter frame space (PIFS) and/or a schedule set by the AP 504 and/or STAs 506A-E.

FIGS. 6A-B show another timing diagram in which aspects of the present disclosure may be employed. As described above, the primary channel (e.g., channel 526) and/or one or more of the secondary channels (e.g., channels 520, 522, and/or 524) may be used for transmissions to legacy STAs and the secondary channels may be used for transmissions to high-efficiency STAs. The channels 520, 522, 524, and/or 526 may or may not be contiguous. In an embodiment, a random backoff counter may be associated with the primary channel, as defined by the enhanced distributed channel access (EDCA) procedure of IEEE 802.11. When the random backoff counter expires, the AP 504 may begin preparing the DL communication 518 for transmission to the STA 506E. If channel 520 has been idle since a time period 602 before the time that the random backoff counter expired, then the AP 504 may transmit the PHY layer preamble 528 and/or the DL communication 514 to the STA 506C at the same or nearly same time as the transmission to the STA 506E. Likewise, if channel 522 has been idle since the time period 602 before the time that the random backoff counter expired, then the AP 504 may transmit the PHY layer preamble 528 and/or the DL communication 512 to the STA 506B at the same or nearly same time as the transmission to the STA 506E. Furthermore, if channel 524 has been idle since the time period 602 before the time that the random backoff counter expired, then the AP 504 may transmit the PHY layer preamble 528 and/or the DL communication 510 to the STA 506A at the same or nearly same time as the transmission to the STA 506E.

Thus, once the random backoff counter expires, at least one transmission is made over the primary channel. Concurrently, transmissions may be made over one or more of the secondary channels if the secondary channel is idle. In an embodiment, the time period 602 may be based on a PIFS time. The PIFS time may be chosen by the AP 504 and/or STAs 506A-E.

FIGS. 6C-D show another timing diagram in which aspects of the present disclosure may be employed. As described above, the primary channel (e.g., channel 526) may be reserved for legacy STAs and the secondary channels (e.g., channels 520, 522, and 524) may be reserved for high-efficiency STAs. The channels 520, 522, 524, and/or 526 may or may not be contiguous. In an embodiment, a random backoff counter may be associated with the primary channel and a one or more random backoff counters may be associated with one or more of the secondary channels. For example, a separate random backoff counter may be associated with each of the secondary channels.

In an embodiment, when a random backoff counter associated with the primary channel or one of the secondary channels expires, the AP 504 begins preparing to transmit (e.g., the PHY layer preamble 528 or the DL communications 510, 512, 514, or 518) on the channel associated with the expired random backoff counter. For example, if the random backoff counter associated with channel 524 expires first, the AP 504 may begin preparing to transmit the PHY 528 and/or the DL communication 510 to STA 506A. If any of the channels associated with unexpired random backoff counters have been idle since the time period 602 before the time that the first random backoff counter expired, then the AP 504 may transmit the PHY layer preamble 528 and/or the appropriate DL communication to the STAs 506A-E associated with the idle channel(s). The PHY layer preamble 528 and/or the appropriate DL communication may be transmitted at the same or nearly same time as the transmission to the STA 506A-E associated with the random backoff counter that expired first.

In another embodiment, access to the channel may be based only on the expiration of the random backoff counter on the primary channel. The secondary channels may be used only if the random backoff counter on the corresponding secondary channel already expired. Note that in this case, the expiration of the random backoff counter on the secondary channel may not trigger a transmission. Rather, expiration of the random backoff counter on the secondary channel may allow trigger a transmission once the random backoff counter on the primary channel also expires. In this way, stricter fairness in accessing the secondary channels may be achieved.

Thus, once one random backoff counter expires, at least one transmission is made over the channel associated with the expired random backoff counter. Concurrently, transmissions may be made over one or more of other channels if any of those channels is idle.

In another embodiment, the AP 504 may designate one of the secondary channels as a high-efficiency primary channel. For example, channel 524 may be designated as the high-efficiency primary channel. The high-efficiency primary channel may be associated with a random backoff counter (e.g., like the primary channel). When the random backoff counter associated with the high-efficiency primary channel expires, the AP 504 may transmit on the high-efficiency primary channel. In some embodiments, the AP 504 may transmit concurrently on the other secondary channels if the other secondary channels have been idle since a time period based on the PIFS timing before the time that the random backoff counter expired. In other embodiments, the AP 504 may transmit concurrently on the other secondary channels if the other secondary channels have been idle since a time period based on an arbitration inter frame spacing (AIFS) timing before the time that the random backoff counter expired. In still other embodiments, the AP 504 may transmit concurrently on the other secondary channels if the other secondary channels have been idle since a time period based on the AIFS timing before the time that the random backoff counter expired, where at least a portion of the random backoff counter associated with the respective secondary channel has expired. For example, the AP 504 may transmit concurrently on channel 520 if channel 520 has been idle since a time period based on the AIFS timing before the time that the random backoff counter associated with channel 524 expired and if the random backoff counter associated with channel 520 has expired.

In any of the modes described above, the backoff procedure in different channels may follow different countdown parameters. For example, each backoff procedure may depend on an access category of the traffic that is going to be delivered on the channel. The backoff procedures in each channel may follow the EDCA procedure defined in IEEE 802.11.

Detection of Packets by STAs

A high-efficiency STA may be able to determine that an incoming transmission comprises a high-efficiency component (OFDMA) and may include information intended for the high-efficiency STA. As described above, legacy STAs may listen for packets from the AP 504 on the primary channel (also referred to as the legacy primary channel). In an embodiment, high-efficiency STAs are assigned to a channel (e.g., a secondary channel) to listen for packets from the AP 504. In another embodiment, high-efficiency STAs detect packets on each channel used by the AP 504 (e.g., each channel used in the BSS). In still another embodiment, the AP 504 defines one or more high-efficiency primary channels. In an embodiment, each high-efficiency STA may detect packets on the legacy primary channel and on the high-efficiency primary channels. In another embodiment, each high-efficiency STA may detect packets on one or more of the high-efficiency primary channels. In another embodiment, each high-efficiency STA may detect packets on the legacy primary channel only. In any of the above embodiments, detection of an incoming high-efficiency transmission may be based on reception of a message. For example, detection of an incoming high-efficiency transmission may be based on reception of a PPDU with the new PHY layer preamble 528 (e.g., high-efficiency PHY layer preamble) that includes information about the high-efficiency transmission on the current channel and/or other channels. As another example, detection of an incoming high-efficiency transmission may be based on reception of a MAC message (e.g., sent either in a legacy or high-efficiency PPDU) that may advertise a high-efficiency transmission starting at a determined time after the MAC message and/or corresponding parameters, as described herein. As another example, detection of an incoming high-efficiency transmission may be based on reception of a legacy PHY layer preamble that also identifies the presence of a high-efficiency transmission on secondary channels via signaling in the STF field, the LTF field, and/or the SIG field that does not compromise the legacy nature of the preamble.

In other embodiments, scheduling mechanisms are used to define a time that the STAs should expect packets from the AP 504. For example, one scheduling mechanism may be based on a target wakeup time (TWT) timing, which is defined in the IEEE 802.11ah protocol. The TWT timing may be a time during which a STA is scheduled to be awake. As another example, another scheduling mechanism may be based on a restricted access window (RAW) timing, which is defined in the IEEE 802.11ah protocol. The RAW timing may be an interval of time during which access to a medium is restricted to a group of STAs. The AP 504 may further include in management messages used to set up the scheduled time (e.g., an RPS information element for RAW, TWT setup messages for TWT, etc.) an indication of the channel allocation for the benefit of the STAs. In another embodiment, the allocation indicated by the AP 504 in such a message may be in response to a message transmitted by a STA to the AP 504 requesting the use of a specific channel or simply the allocation of a channel. The message may be included in a management frame.

The transmissions from the AP 504 may start at the time scheduled according to the TWT timing or the RAW timing. In an embodiment, the random backoff counter, the PIFS timing, and/or the AIFS timing may be used as described herein to determine whether the channel has been idle for an appropriate amount of time. A benefit of scheduling a transmission time based on the TWT timing or the RAW timing may be that the AP 504 then knows when the STAs 506A-E will be awake. In another embodiment, the AP 504 may not use the random backoff counter, the PIFS timing, and/or the AIFS timing. In still another embodiment, the AP 504 may not use the PIFS timing and/or the AIFS timing on secondary channels.

Channel Allocation

Figure 7:
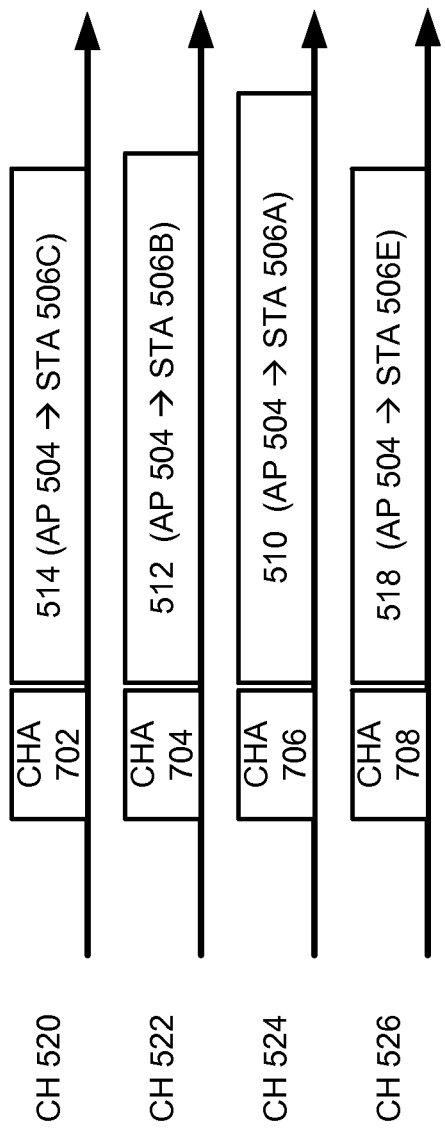
FIG. 7 shows another timing diagram in which aspects of the present disclosure may be employed.

FIG. 7 shows another timing diagram in which aspects of the present disclosure may be employed. As illustrated in FIG. 7, the AP 504 transmits channel allocation messages 702, 704, 706, and 708 on each of the channels 520, 522, 524, and 526, respectively. The channel allocation messages 702, 704, 706, and 708 may provide information to the STAs 506A-E regarding which channel is allocated to which STA. In some embodiments, the channel allocation messages 702, 704, 706, and/or 708 may be the MAC message described above.

The MAC message may include one or more of the following information: a deferral time for third-party STAs, an identifier of STAs that are recipients of the DL-FDMA, in the form of a list of addresses or a group identifier defined a priori by the AP 504, and/or an indication of the channel(s) and bandwidth to be used. The MAC message may also include information required for sending acknowledgments by using UL-FDMA, as described below. Such information may include an indication of power to be used and/or an indication of a backoff from the nominal transmit power of the STA, which may be indicated earlier by the STA. If such information is not conveyed in a reference signal, the AP 504 and the STA may agree to such information a priori through the exchange of management messages between each STA and the AP 504.

The MAC message may be a regular clear to send (CTS) message or an extended CTS message. An extended CTS message may reserve combination of bits not used in frames of type control to indicate that this is a special CTS message. The term "special" as used herein may mean that the CTS message includes additional information, but legacy STAs may still be able to interpret the CTS message as a legacy or regular CTS message. For example, a special CTS message may use a control wrapper frame to indicate the presence of an HTC field. The HTC field may provide four bytes that can be used to embed identifiers of target STAs. As another example, a special CTS message may include additional information after the FCS field.

In an embodiment, the MAC message may be transmitted at a time of short inter frame space (SIFS), PIFS, or AIFS before the start of data transmissions. In another embodiment, the MAC message may be transmitted at a time longer than SIFS, PIFS, or AIFS, where the time may be the time that allows a STA to finish switching channels. The time may be communicated by the STAs to the AP 504. The AP 504 may use the longest of the times received by the intended recipient STAs. If the time is longer than PIFS, then the AP 504 may perform a new backoff procedure before sending the data portion of the transmission.

In an embodiment, if the new PHY layer preamble 528 is available, the PHY layer preamble 528 includes a group identification field that corresponds to a channel allocation of the STAs of the group.

In an embodiment, the channels may be pre-allocated, selected by the STAs 506A-E, and/or selected by the AP 506A-E and explicitly messaged via channel allocation messages 702, 704, 706, and/or 708. Messages may be conveyed by management or control frames sent before the data transmission (e.g., these frames may not be transmitted based on SIFS or PIFS as described above). If the channels are pre-allocated, and if the number of STAs is above a threshold and traffic requests from the STAs are similar, then a random static allocation may be used (e.g., each STA is allocated to a channel, semi-statically). The AP 504 may indicate to the STAs 506A-E which station is allocated to which channel (e.g., via the channel allocation messages 702, 704, 706, and/or 708). If the channels are selected by the STAs 506A-E, STAs 506A-E may select and wait on a channel preferred by the respective STA 506A-E. The STAs 506A-E may explicitly or implicitly (e.g., via any transmission) notify the AP 504 of their presence on the respective channel. If the allocation is explicitly messaged, the channel allocation messages 702, 704, 706, and/or 708 may be sent on each of the channels or just a primary channel. Note that because the STAs 506A-E may be listening on one channel and need to switch to another channel to receive the DL communication from the AP 504, the AP 504 may delay sending DL communications 510, 512, 514, and/or 518 for a period of time after transmission of the channel allocation messages 702, 704, 706, and/or 708 to allow the STAs 506A-E to switch to the appropriate channel. If the STAs 506A-E implicitly notify the AP 504 of their presence, the AP 504 may know of a STA 506A-E location based on reception of any data, control, and/or management frame transmitted by the STA 506A-E for regular operation. In other words, the data, control, and/or management frame may not necessarily be designed for channel indication.

Protection Stage

Figure 8C:
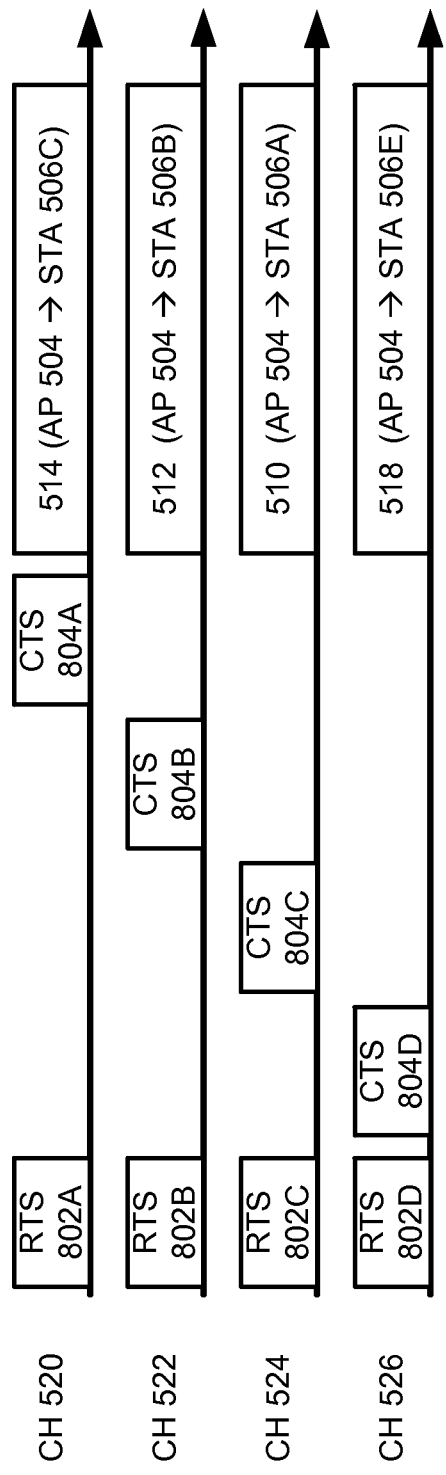

In an embodiment, request to send (RTS) and CTS messages are used by the AP 504 and the STAs 506A-E to ensure that a given channel is free. FIGS. 8A-C show another timing diagram in which aspects of the present disclosure may be employed. In particular, FIGS. 8A-C illustrate the use of RTS and CTS messages.

In an embodiment, the AP 504 performs a backoff procedure in the primary channel (e.g., channel 526) and, once backoff expires, the AP 504 determines whether channels 520, 522, 524, and/or 526 are idle (e.g., using PIFS timing as described above). If a channel is idle, the AP 504 may transmit a RTS message 802 on the idle channel(s) to the STA(s) 506A-E associated with the idle channel(s). In an embodiment, the RTS message 802 may be directed to a single STA 506A-E and simply duplicated across the transmission channels (e.g., as in IEEE 802.11ac). In this case, the recipient STA 506A-E may respond with a CTS message on the primary channel and/or on one or more of the secondary channels. High-efficiency data transmission may then follow the CTS message. In some embodiments, each RTS message 802 transmitted on a channel may be addressed to a different STA 506A-E. In particular, each RTS message 802 may be addressed to the STA 506A-E that is the intended recipient of the data transmission that will follow on that channel. In this case, the STA 506A-E may already be allocated to the channel a priori. In other embodiments, each RTS message 802 transmitted on a channel may be exactly or nearly exactly the same. For example, as illustrated in FIG. 8A, the AP 504 transmits RTS message 802A to the STA 506C on channel 520 if the channel 520 is idle, RTS message 802B to the STA 506B on channel 522 if the channel 522 is idle, RTS message 802C to the STA 506A on channel 524 if the channel 524 is idle, and/or RTS message 802D to the STA 506E on channel 526 if the channel 526 is idle. The AP 504 may transmit multiple RTS messages if the STAs 506A-E are only able to detect messages on the channel allocated to the respective STA 506A-E.

Alternatively, an RTS message 802E may be transmitted by the AP 504 on the primary channel only (e.g., channel 526), as illustrated in FIG. 8B. The AP 504 may transmit RTS message 802E if the STAs 806A-E are able to detect messages on the primary channel. The RTS message 802E may be addressed to a group of STAs involved in DL frequency division multiple access (FDMA), such as the STAs 506A-E. The group of STAs may be identified by a multicast MAC receiver address previously assigned to a certain group of STAs and/or may be identified by additional signaling added to the RTS message 802. A management exchange may have taken place to associate the multicast address with a certain group of STAs. In an embodiment, the RTS message 802 may have the same format as in the IEEE 802.11 specifications. In another embodiment, the RTS message 802 may have a new control and/or management frame format that includes one or more of the information that may be included in the MAC message as discussed above.

If a STA 506A-E is available to accept packets from the AP 504, the STA 506A-E may respond to the RTS message 802 with a CTS message 804. The STA 506A-E may respond to the RTS message 802 on an available channel (e.g., the channel that the STA 506A-E desires or expects the AP 504 to use to transmit the DL communications, the channel indicated in the RTS message 802, the channel that is known by the AP 504 and/or the STA 506A-E a priori, etc.). For example, STA 506C may be allocated to channel 520 and transmit a CTS 804A to the AP 504 on the channel 520 if the STA 506C is available. Likewise, STA 506B may be allocated to channel 522 and transmit a CTS 804B to the AP 504 on the channel 522 if the STA 506B is available, STA 506A may be allocated to channel 524 and transmit a CTS 804C to the AP 504 on the channel 524 if the STA 506C is available, and/or STA 506E may be allocated to channel 526 and transmit a CTS 804D to the AP 504 on the channel 526 if the STA 506E is available.

In an embodiment, the CTS messages 804A-D may be transmitted to the AP 504 simultaneously (e.g., if the AP 504 and/or the STAs 506A-E support UL FDMA or UL spatial division multiple access (SDMA)), as illustrated in FIGS. 8A-B. In another embodiment, the CTS messages 804A-D may be transmitted to the AP 504 in a staggered fashion such that no CTS message 804A-D is transmitted at the same time (e.g., if the AP 504 and/or the STAs 506A-E do not support UL FDMA or UL SDMA), as illustrated in FIG. 8C. The CTS messages 804A-D may be transmitted based on a schedule provided in the RTS messages 802A-D and/or based on a schedule provided in a previous message.

The DL communications 510, 512, 514, and/or 518 may be only transmitted by the AP 504 if a CTS message is received on the respective channel. In an embodiment, upon expiration of the random backoff counter, the AP 504 may send a CTS message on the primary channel and/or on one or more of the secondary channels (e.g., on secondary channels detected to be idle for a PIFS time), and follow the CTS message with the high-efficiency DL-OFDMA transmission. The CTS message may be a CTS-to-self message (e.g., including the MAC address of the sender AP 504) or may be addressed to one or more STAs. The CTS message may be identical across multiple channels or may be different across channels (e.g., having a different MAC address). The CTS message may be sent on the primary channel and may include information identifying the start of the high-efficiency transmission. The information may be in a format that does not compromise the legacy format of the frame (e.g., either in the PHY layer preamble or in the MAC payload).

Acknowledgment Stage

In an embodiment, restrictions can be placed on the duration of a packet. In some embodiments, transmissions by the AP 504 have different lengths. In other embodiments, transmissions by the AP 504 have the same length.

Following the DL communications 510, 512, 514, and/or 518, the STAs 506A-E may respond with a block acknowledgment (BA) acknowledging that the DL communication was received. The STAs 506A-E may respond with the BA on their own volition or may be prompted to by the AP 504 (e.g., via a block acknowledgment request (BAR)).

FIGS. 9A-E shows another timing diagram in which aspects of the present disclosure may be employed. In particular, FIGS. 9A-E illustrate the use of BAs and BARs as described herein. In an embodiment, if the AP 504 and/or the STAs 506A-E cannot handle simultaneous UL communications (e.g., do not operate using UL FDMA), one of the STAs 506A-E responds immediately with a BA after the DL communication is complete. The remaining STAs 506A-E then respond with a BA after receiving a BAR. The BAR may be transmitted on the channel that the DL communication was transmitted on, the primary channel, and/or the high-efficiency primary channel.

Figure 9A:
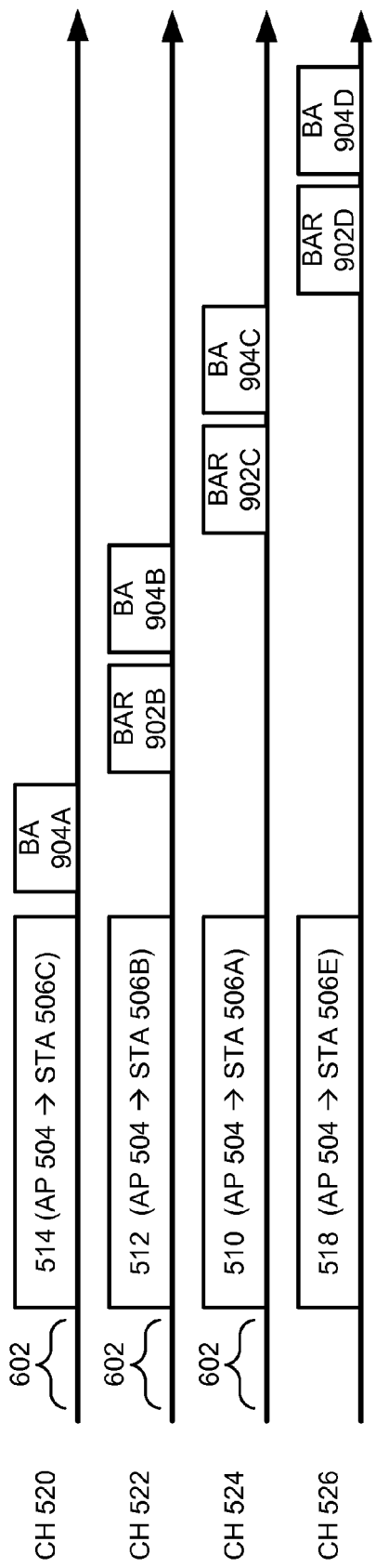

For example, as illustrated in FIG. 9A, STA 506C may respond with a BA 904A after the DL communication 514 is complete. After the BA 904A has been transmitted to the AP 504, the AP 504 may transmit a BAR 902B to the STA 506B on the channel 522, which is the channel that the DL communication 512 was received by the STA 506B. Once the STA 506B receives the BAR 902B, the STA 506B may respond with a BA 904B. The BAR and BA cycle then continues for the remaining STAs (e.g., STA 506A and STA 506E). The AP 504 may set the acknowledgment policy of the data transmitted to multiple STAs 506A-E such that no more than one STA 506A-E responds with an immediate acknowledgment or BA. The STA 506A-E receiving an immediate acknowledgment request or BAR may transmit the acknowledgment or BA on the same channel where data was received and/or on the primary channel. An additional BAR may be sent by the AP 504 to other STAs 506A-E on the primary channel and/or on one or more of the secondary channels, such as the same channel where data was transmitted to the corresponding STAs 506A-E. In this case, the STA 506A-E may transmit the acknowledgment or BA on the same channel where the BAR was received and/or on the primary channel.

Figure 9B:
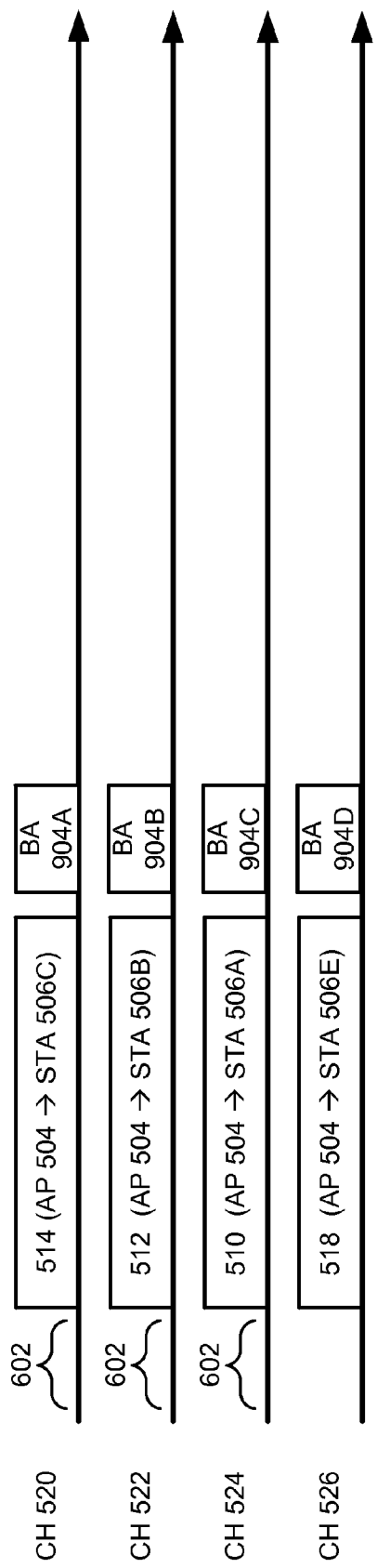

In an embodiment, if the AP 504 and/or the STAs 506A-E can handle simultaneous UL communications (e.g., do operate using UL FDMA), all of the STAs 506A-E may respond with a BA after the DL communications are complete (e.g., end of transmission is a trigger for all STAs 506A-E to send the BAs). The BAs may be transmitted on the same channel as the channel where the DL communication was received. For example, as illustrated in FIG. 9B, STAs 506A-C and 506E each respond with a BA 904A-D immediately after the DL communications 510, 512, 514, and 518 are complete. The BAs 904A-D may be transmitted concurrently.

In an embodiment, the AP 504 transmits BARs 902A-D to the STAs 506A-C and 506E to trigger the transmission of the BAs 904A-D. For example, as illustrated in FIG. 9C, the BARs 902A-D may each be transmitted on a separate channel simultaneously. The BARs 902A-D may be transmitted after the end of the transmission of the longest DL communication (e.g., DL communication 512 in FIG. 9C). The STAs 506A-C and 506E may then respond to the BARs 902A-D with BAs 904A-D using the channel upon which the respective BARs 902A-D were received.

In an embodiment, the AP 504 broadcasts a single BAR 902E to the STAs 506A-C and 506E to trigger the transmission of the BAs 904A-D. The single BAR 902E may be transmitted over the primary channel. For example, as illustrated in FIG. 9D, BAR 902E is transmitted by the AP 504 on the channel 526 after the end of the transmission of the longest DL communication, DL communication 512. The BAR 902E is received by the STAs 506A-C and 506E. The STAs 506A-C and 506E then respond with BAs 904A-D on the channel that the DL communication was received on.

In an embodiment, UL multiuser multiple input multiple output (MU-MIMO) is used to deliver BAs in a parallel manner to the AP 504. For example, as illustrated in FIG. 9E, each of the STAs 506A-C and 506E may transmit a BA on the same frequency (e.g., the primary frequency) at the same time. Such UL communications is represented as BA 904E, which includes the BAs transmitted by each of the STAs 506A-C and 506E.

Note that in any or all of the above embodiments, BARs and/or BAs may be transmitting in a legacy or high-efficiency PPDU format. When the BARs and/or BAs are transmitted in high-efficiency PPDU format, the bandwidth may be smaller than 20 MHz. Different BARs and/or BAs may have a different duration, which may depend on the bandwidth used for transmission (not shown).

Use Cases

In an embodiment, the DL FDM protocol described herein with respect to FIGS. 5A-9E is implemented in several applications. For example, a BSA may include legacy STAs and high-efficiency STAs. The DL FDM protocol may use otherwise unused bandwidth in the communication medium by assigning some of the STAs to a portion of the otherwise unused bandwidth. This may allow the legacy STAs and/or the high-efficiency STAs to communicate concurrently. This may be beneficial if the BSS range of the wireless network is restricted to high rate users.

As another example, the DL FDM protocol may allow for multiplexing STAs at different ranges with different power allocations. For example, the AP 504 may have a finite amount of power available for transmitting packets. Some STAs, such as STA 506D and STA 506E may be located far away from the AP 504 as compared to other STAs. Thus, more power may be needed to transmit to these far away STAs. However, the power used to transmit to the far away STAs can be reduced slightly (e.g., enough so as to not compromise connectivity) in order to enable low power transmissions to STAs (e.g., STAs 506A-C) located near the AP 504. If the AP 504 has a total power allotment of 20 dB for transmissions, instead of 20 dB, 19 dB could be allocated for transmitting packets to the STA 506E. The remaining 1 dB could be split into three parts so that the AP 504 can then also transmit packets to the STAs 506A-C, which are closer to the AP 504. This mechanism may require signaling from the STA 506E to the AP 504 indicating what is the "margin" in power reduction that can be tolerated by the STA 506E.

As another example, frequency diversity can be achieved if the PHY layer uses a tone interleaved approach. With frequency diversity, a frequency hopping system is created that requires minimal interference coordination. Tones may be divided into two or more subsets. A first STA may transmit and/or receive data via tones in the first subset and a second STA may transmit and/or receive data via tones in the second subset. As long as the first subset and the second subset do not overlap, interference may be avoided.

Flowcharts

Figure 10:
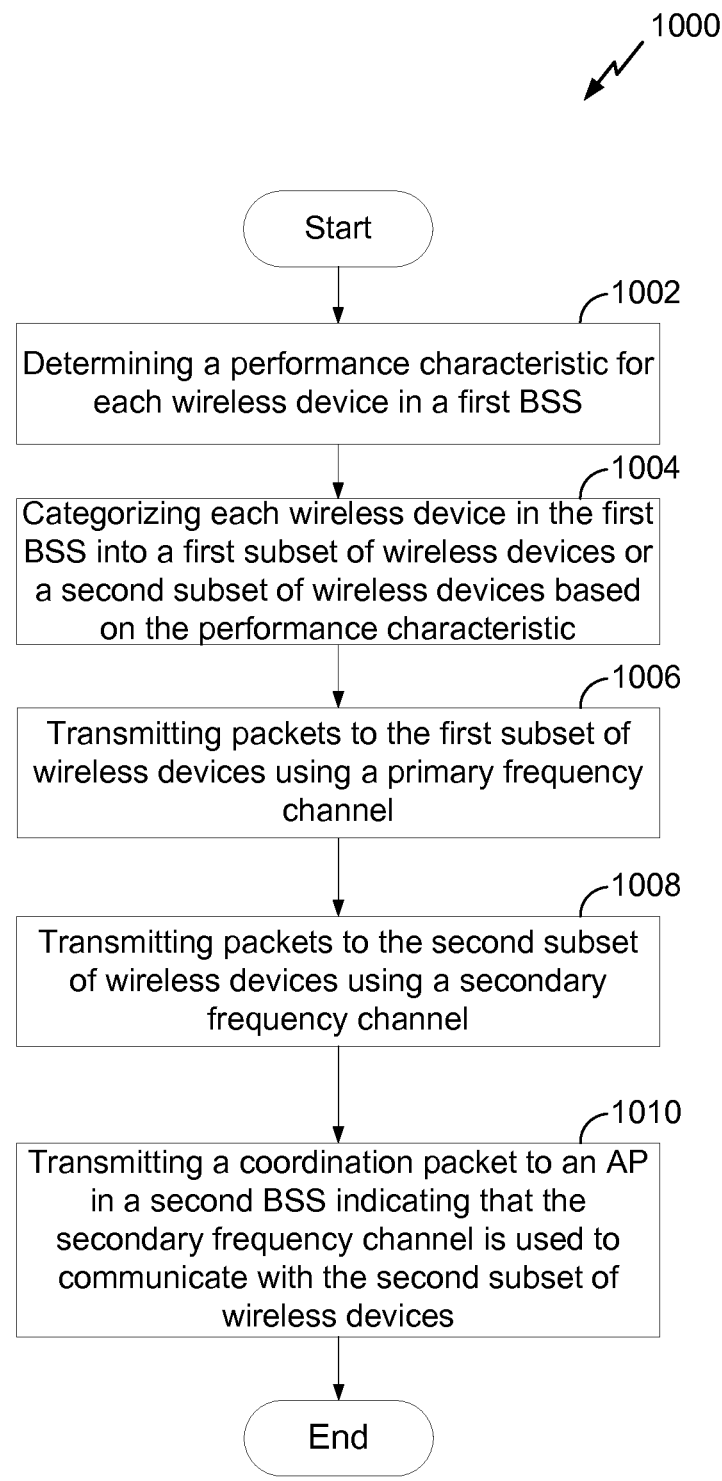
FIG. 10 is a flowchart of a process for high-efficiency wireless frequency division multiplexing.

FIG. 10 is a flowchart of a process 1000 for high-efficiency wireless frequency division multiplexing. In an embodiment, the process 1000 may be performed by an AP, such as the AP 504. At block 1002, the process 1000 determines a performance characteristic for each wireless device in a first BSS. In an embodiment, the performance characteristic can include physical and/or RF characteristics such as, for example, an SINR, an RF geometry, an RSSI, an MCS value, an interference level, a signal level, a transmission capability, and/or the like.

At block 1004, the process 1000 categorizes each wireless device in the first BSS into a first subset of wireless devices or a second subset of wireless devices based on the performance characteristic. At block 1006, the process 1000 transmits packets to the first subset of wireless devices using a primary frequency channel. At block 1008, the process 1000 transmits packets to the second subset of wireless devices using a secondary frequency channel.

At block 1010, the process 1000 transmits a coordination packet to an AP in a second BSS indicating that the secondary frequency channel is used to communicate with the second subset of wireless devices. In an embodiment, the AP in the second BSS transmits packets to a first set of wireless devices in the second BSS using the primary frequency channel and transmits a packet to a second set of wireless devices in the second BSS using a ternary frequency channel in response to receiving the coordination packet. After block 1010, the process 1000 ends.

Figure 11:
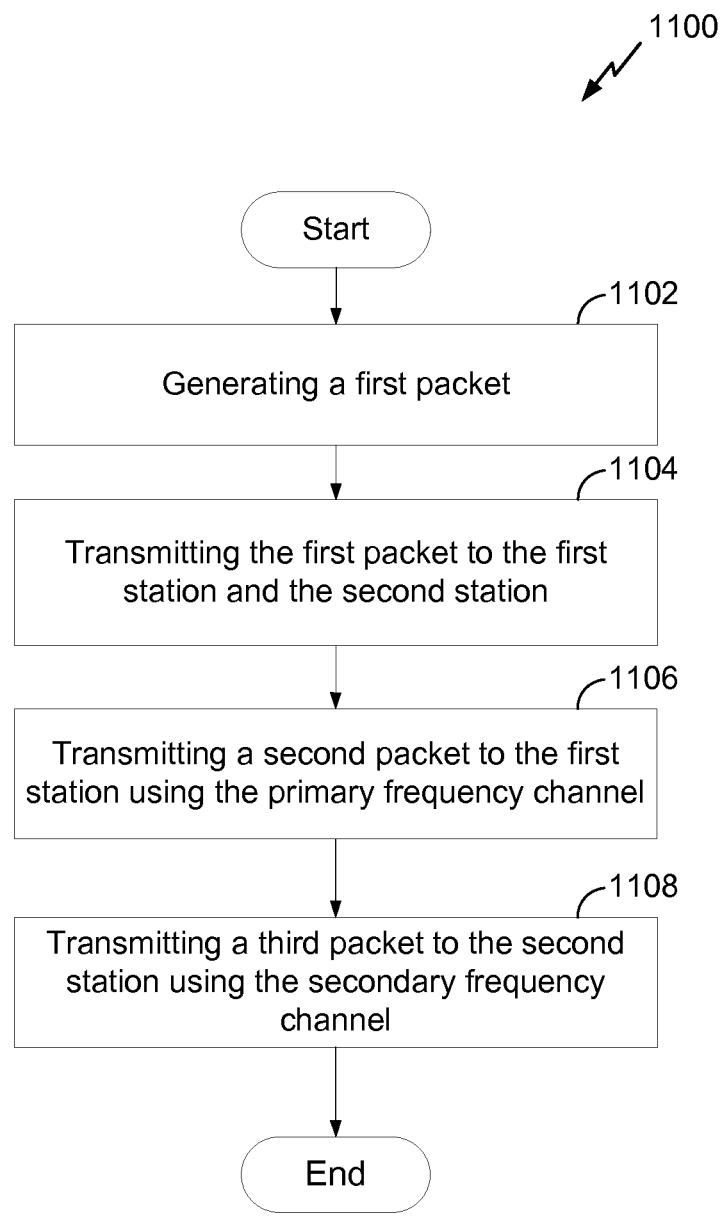
FIG. 11 is a flowchart of a process for transmitting data.

FIG. 11 is a flowchart of a process 1100 for transmitting data. In an embodiment, the process 1100 may be performed by an AP, such as the AP 504. At block 1102, the process 1100 generates a first packet. In an embodiment, the first packet comprises a physical layer and a MAC layer. In a further embodiment, the MAC layer allocates a first STA to a primary frequency channel and a second STA to a secondary frequency channel. At block 1104, the process 1100 transmits the first packet to the first STA and the second STA. At block 1106, the process 1100 transmits a second packet to the first STA using the primary frequency channel. At block 1108, the process 1100 transmits a third packet to the second STA using the secondary frequency channel. After block 1108, the process 1100 ends.

Figure 12:
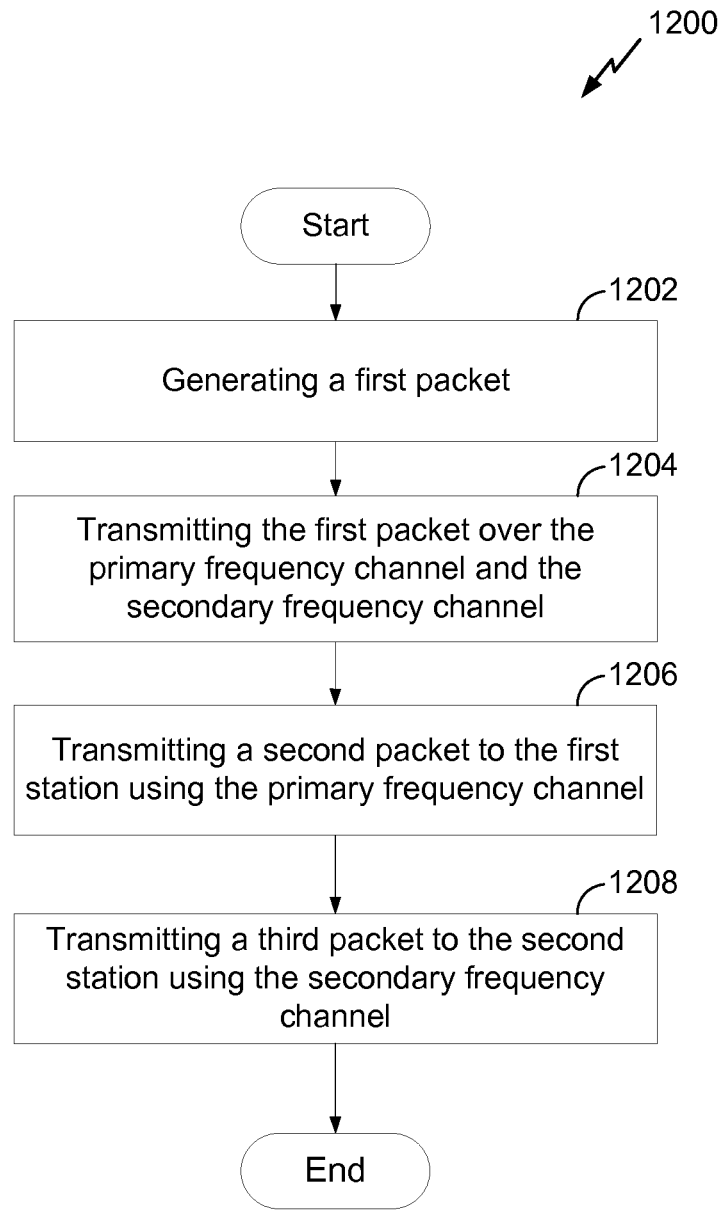
FIG. 12 is another flowchart of a process for transmitting data.

FIG. 12 is a flowchart of a process 1200 for transmitting data. In an embodiment, the process 1200 may be performed by an AP, such as the AP 504. At block 1202, the process 1200 generates a first packet. In an embodiment, the first packet comprises a physical layer preamble. In a further embodiment, the physical layer preamble comprises an allocation of a first STA to a primary frequency channel and a second STA to a secondary frequency channel. At block 1204, the process 1200 transmits the first packet over the primary frequency channel and the secondary frequency channel. At block 1206, the process 1200 transmits a second packet to the first STA using the primary frequency channel. In an embodiment, the second packet is transmitted after the first packet. At block 1208, the process 1200 transmits a third packet to the second STA using the secondary frequency channel. In an embodiment, the third packet is transmitted after the first packet. After block 1208, the process 1200 ends.

Figure 13:
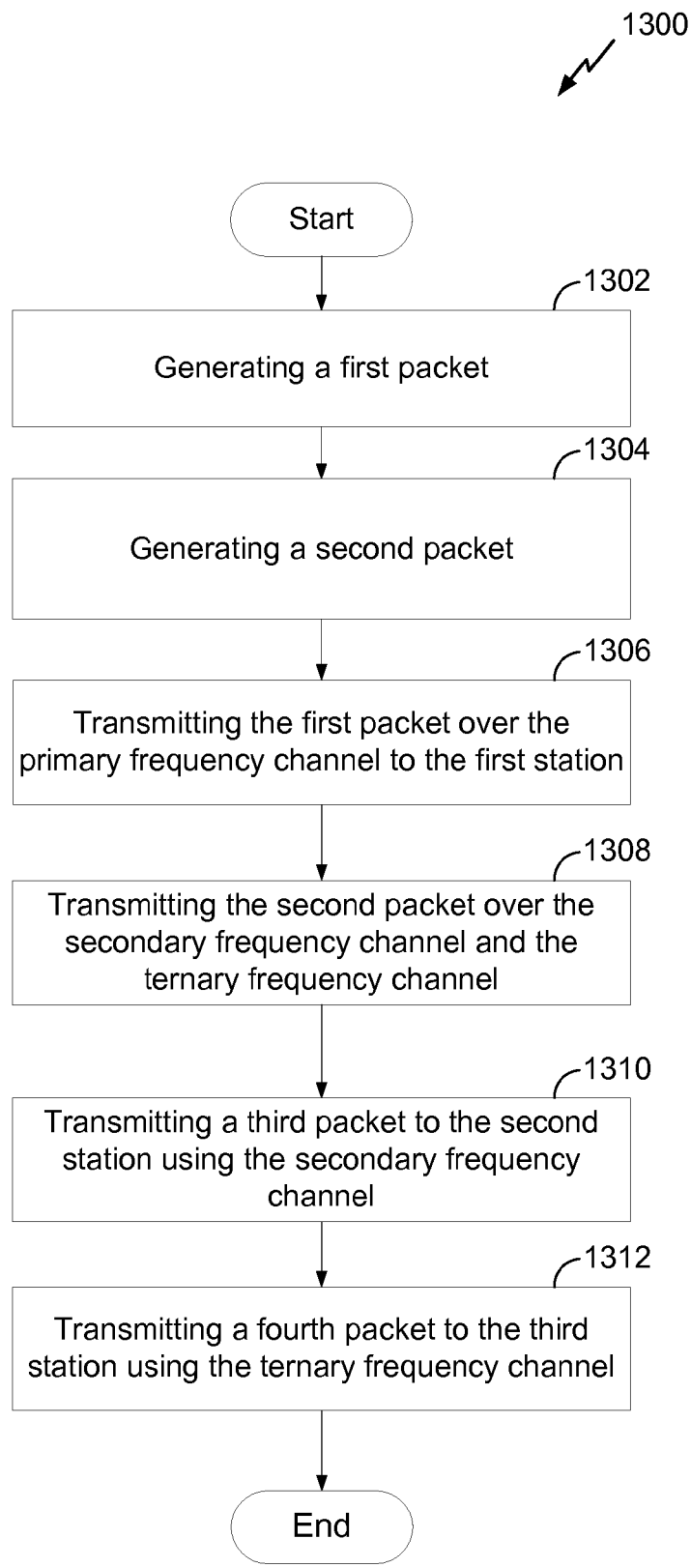
FIG. 13 is another flowchart of a process for transmitting data.

FIG. 13 is a flowchart of a process 1300 for transmitting data. In an embodiment, the process 1300 may be performed by an AP, such as the AP 504. At block 1302, the process 1300 generates a first packet for transmission to a first STA over a primary frequency channel. At block 1304, the process 1300 generates a second packet. In an embodiment, the second packet comprises a physical layer preamble. In a further embodiment, the physical layer preamble comprises an allocation of a second STA to a secondary frequency channel and a third STA to a ternary frequency channel. At block 1306, the process 1300 transmits the first packet over the primary frequency channel to the first STA. In an embodiment, the first STA is not configured to communicate over the secondary frequency channel or the ternary frequency channel. At block 1308, the process 1300 transmits the second packet over the secondary frequency channel and the ternary frequency channel.

At block 1310, the process 1300 transmits a third packet to the second STA using the secondary frequency channel. In an embodiment, the third packet is transmitted after the second packet. At block 1312, the process 1300 transmits a fourth packet to the third STA using the ternary frequency channel. In an embodiment, the fourth packet is transmitted after the second packet. After block 1312, the process 1300 ends.

Figure 14:
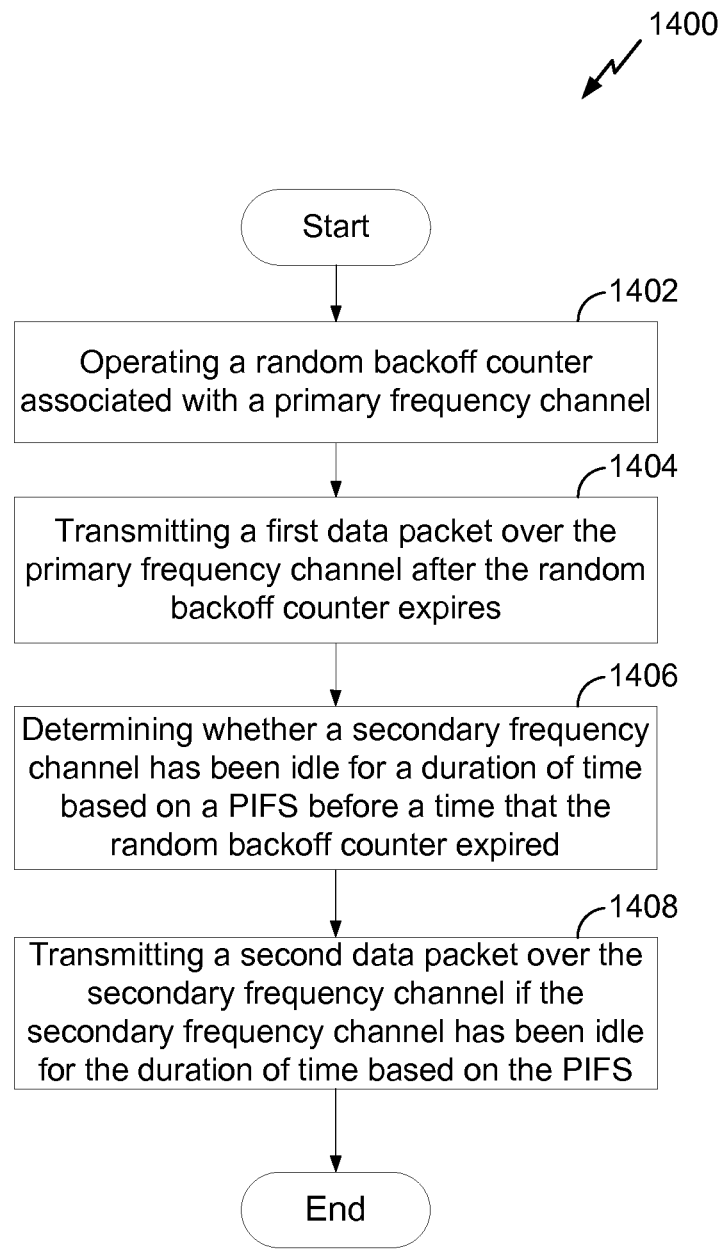
FIG. 14 is another flowchart of a process for transmitting data.

FIG. 14 is a flowchart of a process 1400 for transmitting data. In an embodiment, the process 1400 may be performed by an AP, such as the AP 504. At block 1402, the process 1400 operates a random backoff counter associated with a primary frequency channel. At block 1404, the process 1400 transmits a first data packet over the primary frequency channel after the random backoff counter expires. In an embodiment, the first data packet is transmitted to a first STA.

At block 1406, the process 1400 determines, after the random backoff counter expires, whether a secondary frequency channel has been idle for a duration of time based on a point coordination function inter frame space (PIFS) before a time that the random backoff counter expired. At block 1408, the process 1400 transmits a second data packet over the secondary frequency channel if the secondary frequency channel has been idle for the duration of time based on the PIFS before the time that the random backoff counter expired. In an embodiment, the second data packet is transmitted to a second station. After block 1408, the process 1400 ends.

Figure 15:
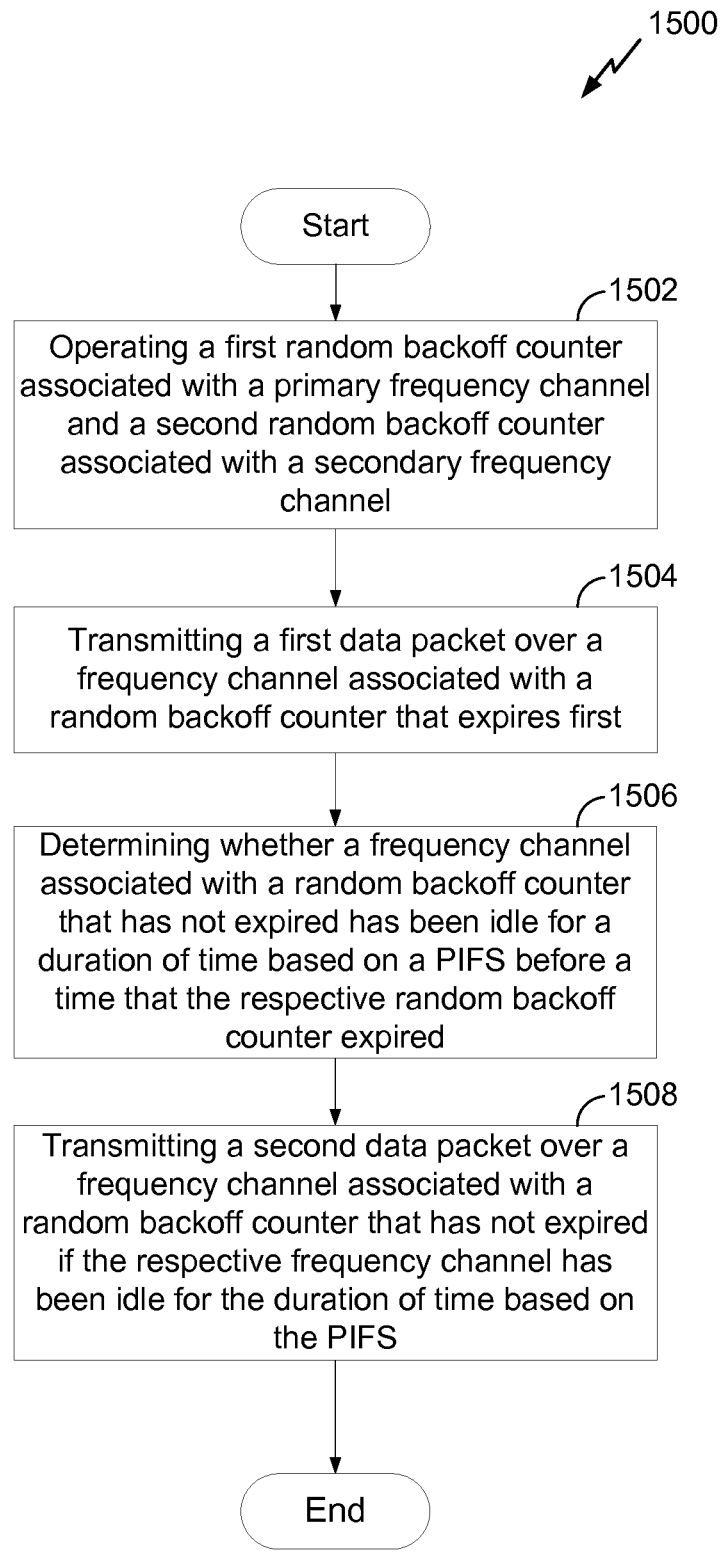
FIG. 15 is another flowchart of a process for transmitting data.

FIG. 15 is a flowchart of a process 1500 for transmitting data. In an embodiment, the process 1500 may be performed by an AP, such as the AP 504. At block 1502, the process 1500 operates a first random backoff counter associated with a primary frequency channel and a second random backoff counter associated with a secondary frequency channel. At block 1504, the process 1500 transmits a first data packet over a frequency channel associated with a random backoff counter that expires first. In an embodiment, the first data packet is transmitted to a first station over the primary frequency channel if the first random backoff counter expires before the second random backoff counter. In a further embodiment, the second data packet is transmitted to a second station over the secondary frequency channel if the second random backoff counter expires before the first random backoff counter.

At block 1506, the process 1500 determines, after the first of the first random backoff counter or the second random backoff counter expires, whether a frequency channel associated with a random backoff counter that has not expired has been idle for a duration of time based on a point coordination function inter frame space (PIFS) before a time that the respective random backoff counter expired. At block 1508, the process 1500 transmits a second data packet over a frequency channel associated with a random backoff counter that has not expired if the respective frequency channel has been idle for the duration of time based on the PIFS before the time that the respective random backoff counter expired. After block 1508, the process 1500 ends.

Figure 16:
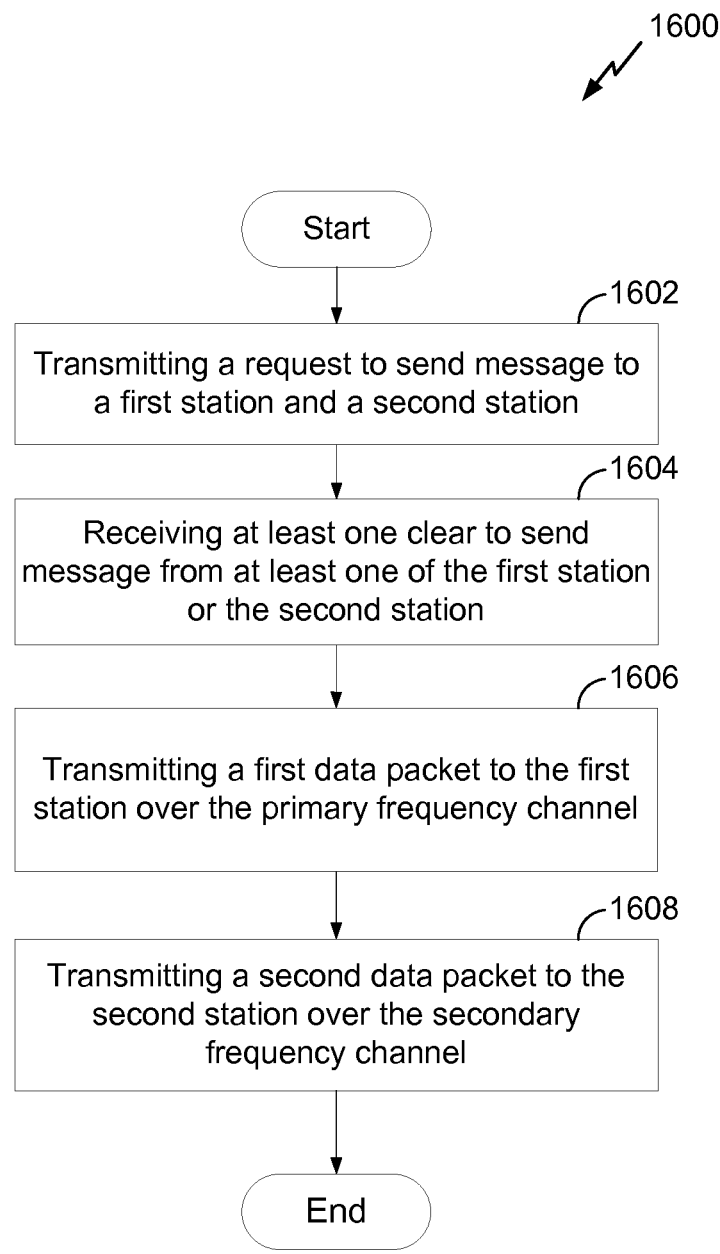
FIG. 16 is another flowchart of a process for transmitting data.

FIG. 16 is a flowchart of a process 1600 for transmitting data. In an embodiment, the process 1600 may be performed by an AP, such as the AP 504. At block 1602, the process 1600 transmits a request to send message to a first station and a second station. At block 1604, the process 1600 receives at least one clear to send message from at least one of the first station or the second station.

At block 1606, the process 1600 transmits, in response to reception of a clear to send message from the first station over a primary frequency channel, a first data packet to the first station over the primary frequency channel. At block 1608, the process 1600 transmits, in response to reception of a clear to send message from the second station over a secondary frequency channel, a second data packet to the second station over the secondary frequency channel. After block 1608, the process 1600 ends.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for transmitting data, comprising:
operating, by an access point, a random backoff counter associated with a primary frequency channel;
transmitting, by the access point, a first data packet over the primary frequency channel to a first station after the random backoff counter expires;
determining, by the access point after the random backoff counter expires, whether a secondary frequency channel has been idle for a duration of time based on a time interval before a time that the random backoff counter expired;
operating a second random backoff counter associated with the secondary frequency channel;
transmitting, by the access point, a second data packet over the secondary frequency channel to a second station if the secondary frequency channel has been idle for the duration of time based on the time interval before the time that the random backoff counter expired and if the second random backoff counter expires before the random backoff counter;
transmitting the second data packet over the primary frequency channel if the random backoff counter expires before the second random backoff counter;
determining, after the first of the random backoff counter or the second random backoff counter expires, whether a frequency channel associated with a random backoff counter that has not expired has been idle for a duration of time based on a point coordination function inter frame space (PIFS) before a time that the respective random backoff counter expired; and
transmitting a data packet corresponding to a random backoff counter that has not expired if the respective frequency channel has been idle for the duration of time based on the PIFS before the time that the respective random backoff counter expired.

2. The method of claim 1, the time interval comprising a point coordination function inter frame space (PIFS).

3. The method of claim 1, further comprising transmitting a fourth data packet over a ternary frequency channel if the ternary frequency channel has been idle for a duration of time based on an arbitration inter frame spacing (AIFS) before a time that the second random backoff counter expired.

4. The method of claim 1, further comprising transmitting the second data packet over the secondary frequency channel and a ternary frequency channel, the second data packet comprising a physical layer preamble, and the physical layer preamble comprising an allocation of the second station to the secondary frequency channel and a third station to the ternary frequency channel.

5. The method of claim 4, further comprising:
transmitting, after transmission of the second data packet, a third data packet to the second station over the secondary frequency channel; and
transmitting, after transmission of the second data packet, a fourth data packet to the third station of the ternary frequency channel.

6. The method of claim 4, the primary frequency channel, the secondary frequency channel, and the ternary frequency channel being contiguous in an operating bandwidth.

7. The method of claim 4, the primary frequency channel, the secondary frequency channel, and the ternary frequency channel not being contiguous in an operating bandwidth.

8. The method of claim 4, the first station not configured to communicate over the secondary frequency channel or the ternary frequency channel.

9. The method of claim 1, operating a random backoff counter comprising operating the random backoff counter at a time based on a restricted access window (RAW) timing, the RAW timing being an interval of time during which access to a medium is restricted to a group of stations.

10. The method of claim 1, operating a random backoff counter comprising operating the random backoff counter at a time based on a target wakeup time (TWT), the TWT being a time during which the first station is awake.

11. The method of claim 1, further comprising:
receiving a first block acknowledgment from the second station over the secondary frequency channel after transmission of the second data packet is complete;
transmitting a block acknowledgment request to the first station over the primary frequency channel in response to reception of the first block acknowledgment; and
receiving a second block acknowledgment from the first station over the primary frequency channel in response to the block acknowledgment request.

12. The method of claim 1, further comprising:
receiving a first block acknowledgment from the second station over the secondary frequency channel after transmission of the second data packet is complete; and
receiving a second block acknowledgment from the first station over the primary frequency channel after transmission of the first data packet is complete, the first block acknowledgment and the second block acknowledgment received at a same time.

13. The method of claim 1, further comprising:
transmitting a block acknowledgment request to the first station over the primary frequency channel and the second station over the secondary frequency channel after transmission of the first data packet and the second data packet is complete;
receiving a first block acknowledgment from the second station over the secondary frequency channel in response to the block acknowledgment request; and
receiving a second block acknowledgment from the first station over the primary frequency channel in response to the block acknowledgment request, the first block acknowledgment and the second block acknowledgment being received at a same time.

14. The method of claim 1, further comprising:
transmitting a block acknowledgment request to the first station and the second station over the primary frequency channel after transmission of the first data packet and the second data packet is complete;
receiving a first block acknowledgment from the second station over the secondary frequency channel in response to the block acknowledgment request; and receiving a second block acknowledgment from the first station over the primary frequency channel in response to the block acknowledgment request, the first block acknowledgment and the second block acknowledgment being received at a same time.

15. The method of claim 1, further comprising:
receiving a first block acknowledgment from the second station over the primary frequency channel after transmission of the second data packet is complete; and
receiving a second block acknowledgment from the first station over the primary frequency channel after transmission of the first data packet is complete, the first block acknowledgment and the second block acknowledgment being received at a same time.

16. An access point for transmitting data, comprising:
means for operating a random backoff counter associated with a primary frequency channel;
means for transmitting a first data packet over the primary frequency channel to a first station after the random backoff counter expires;
means for determining, after the random backoff counter expires, whether a secondary frequency channel has been idle for a duration of time based on a time interval before a time that the random backoff counter expired;
means for operating a second random backoff counter associated with the secondary frequency channel,
wherein the means for transmitting further comprises means for transmitting a second data packet over the secondary frequency channel to a second station if the secondary frequency channel has been idle for the duration of time based on the time interval before the time that the random backoff counter expired and if the random backoff counter expires before the second random backoff counter, and
wherein the means for transmitting further comprises means for transmitting the second data packet over the secondary frequency channel if the second random backoff counter expires before the random backoff counter; and
means for determining, after the first of the random backoff counter or the second random backoff counter expires, whether a frequency channel associated with a random backoff counter that has not expired has been idle for a duration of time based on a point coordination function inter frame space (PIFS) before a time that the respective random backoff counter expired,
wherein the means for transmitting further comprises means for transmitting a data packet corresponding to a random backoff counter that has not expired if the respective frequency channel has been idle for the duration of time based on the PIFS before the time that the respective random backoff counter expired.

17. The access point of claim 16, the time interval comprising a point coordination function inter frame space (PIFS).

18. The access point of claim 16, further comprising means for transmitting a fourth data packet over a ternary frequency channel if the ternary frequency channel has been idle for a duration of time based on an arbitration inter frame spacing (AIFS) before a time that the second random backoff counter expired.

19. The access point of claim 16, means for operating a random backoff counter comprising means for operating the random backoff counter at a time based on a restricted access window (RAW) timing, the RAW timing being an interval of time during which access to a medium is restricted to a group of stations.

20. The access point of claim 16, means for operating a random backoff counter comprising means for operating the random backoff counter at a time based on a target wakeup time (TWT), the TWT being a time during which the first station is awake.

21. The access point of claim 16, the means for operating comprising a processor, the means for transmitting the first data packet and the means for transmitting the second data packet comprising a transmitter, and the means for determining comprising a signal detector.

22. A non-transitory computer-readable medium comprising code that, when executed, causes an access point to:
operate a random backoff counter associated with a primary frequency channel;
transmit a first data packet over the primary frequency channel to a first station after the random backoff counter expires;
determine, after the random backoff counter expires, whether a secondary frequency channel has been idle for a duration of time based on a time interval before a time that the random backoff counter expired;
operate a second random backoff counter associated with the secondary frequency channel;
transmit a second data packet over the secondary frequency channel to a second station if the secondary frequency channel has been idle for the duration of time based on the time interval before the time that the random backoff counter expired and if the random backoff counter expires before the second random backoff counter;
transmit the second data packet over the secondary frequency channel if the second random backoff counter expires before the random backoff counter;
determine, after the first of the random backoff counter or the second random backoff counter expires, whether a frequency channel associated with a random backoff counter that has not expired has been idle for a duration of time based on a point coordination function inter frame space (PIFS) before a time that the respective random backoff counter expired; and
transmit a data packet corresponding to a random backoff counter that has not expired if the respective frequency channel has been idle for the duration of time based on the PIFS before the time that the respective random backoff counter expired.

23. The medium of claim 22, the time interval comprising a point coordination function inter frame space (PIFS).

24. The medium of claim 22, comprising code that, when executed, causes an access point to transmit a fourth data packet over a ternary frequency channel if the ternary frequency channel has been idle for a duration of time based on an arbitration inter frame spacing (AIFS) before a time that the second random backoff counter expired.

25. The medium of claim 22, comprising code that, when executed, causes an access point to operate the random backoff counter at a time based on a restricted access window (RAW) timing, the RAW timing being an interval of time during which access to a medium is restricted to a group of stations.

26. The medium of claim 22, comprising code that, when executed, causes an access point to operate the random backoff counter at a time based on a target wakeup time (TWT), the TWT being a time during which the first station is awake.

27. An access point for transmitting data, comprising:
a processor configured to operate a random backoff counter associated with a primary frequency channel and a second random backoff counter associated with a secondary frequency channel;
a transmitter configured to transmit a first data packet over the primary frequency channel to a first station after the random backoff counter expires; and
a signal detector configured to determine, after the random backoff counter expires, whether the secondary frequency channel has been idle for a duration of time based on a time interval before a time that the random backoff counter expired, the transmitter further configured to transmit a second data packet over the secondary frequency channel to a second station if the secondary frequency channel has been idle for the duration of time based on the time interval before the time that the random backoff counter expired and if the random backoff counter expires before the second random backoff counter,
the transmitter further configured to transmit the second data packet over the secondary frequency channel if the second random backoff counter expires before the random backoff counter, the signal detector further configured to determine, after the first of the random backoff counter or the second random backoff counter expires, whether a frequency channel associated with a random backoff counter that has not expired has been idle for a duration of time based on a point coordination function inter frame space (PIFS) before a time that the respective random backoff counter expired, and the transmitter further configured to transmit a data packet corresponding to a random backoff counter that has not expired if the respective frequency channel has been idle for the duration of time based on the PIFS before the time that the respective random backoff counter expired.

28. The access point of claim 27, the time interval comprising a point coordination function inter frame space (PIFS).

29. The access point of claim 27, the transmitter further configured to transmit a fourth data packet over a ternary frequency channel if the ternary frequency channel has been idle for a duration of time based on an arbitration inter frame spacing (AIFS) before a time that the second random backoff counter expired.

30. The access point of claim 27, the transmitter further configured to transmit the second data packet over the secondary frequency channel and a ternary frequency channel, the second data packet comprising a physical layer preamble, and the physical layer preamble comprising an allocation of the second station to the secondary frequency channel and a third station to the ternary frequency channel.

31. The access point of claim 30, the transmitter further configured to:
transmit, after transmission of the second data packet, a third data packet to the second station over the secondary frequency channel; and
transmit, after transmission of the second data packet, a fourth data packet to the third station of the ternary frequency channel.

32. The access point of claim 30, the primary frequency channel, the secondary frequency channel, and the ternary frequency channel being contiguous in an operating bandwidth.

33. The access point of claim 30, the primary frequency channel, the secondary frequency channel, and the ternary frequency channel not being contiguous in an operating bandwidth.

34. The access point of claim 30, the first station not configured to communicate over the secondary frequency channel or the ternary frequency channel.

35. The access point of claim 27, the processor further configured to operate the random backoff counter at a time based on a restricted access window (RAW) timing, the RAW timing being an interval of time during which access to a medium is restricted to a group of stations.

36. The access point of claim 27, the processor further configured to operate the random backoff counter at a time based on a target wakeup time (TWT), the TWT being a time during which the first station is awake.

37. The access point of claim 27, further comprising a receiver configured to receive a first block acknowledgment from the second station over the secondary frequency channel after transmission of the second data packet is complete, the transmitter further configured to transmit a block acknowledgment request to the first station over the primary frequency channel in response to reception of the first block acknowledgment, and the receiver further configured to receive a second block acknowledgment from the first station over the primary frequency channel in response to the block acknowledgment request.

38. The access point of claim 27, further comprising a receiver configured to receive a first block acknowledgment from the second station over the secondary frequency channel after transmission of the second data packet is complete, the receiver further configured to receive a second block acknowledgment from the first station over the primary frequency channel after transmission of the first data packet is complete, and the first block acknowledgment and the second block acknowledgment being received at a same time.

39. The access point of claim 27, the transmitter further configured to transmit a block acknowledgment request to the first station over the primary frequency channel and the second station over the secondary frequency channel after transmission of the first data packet and the second data packet is complete.

40. The access point of claim 39, further comprising a receiver configured to receive a first block acknowledgment from the second station over the secondary frequency channel in response to the block acknowledgment request, the receiver further configured to receive a second block acknowledgment from the first station over the primary frequency channel in response to the block acknowledgment request, and the first block acknowledgment and the second block acknowledgment being received at a same time.

41. The access point of claim 27, the transmitter further configured to transmit a block acknowledgment request to the first station and the second station over the primary frequency channel after transmission of the first data packet and the second data packet is complete.

42. The access point of claim 41, further comprising a receiver configured to receive a first block acknowledgment from the second station over the secondary frequency channel in response to the block acknowledgment request, the receiver further configured to receive a second block acknowledgment from the first station over the primary frequency channel in response to the block acknowledgment request, and the first block acknowledgment and the second block acknowledgment being received at a same time.

43. The access point of claim 27, further comprising a receiver configured to receive a first block acknowledgment from the second station over the primary frequency channel after transmission of the second data packet is complete, the receiver further configured to receive a second block acknowledgment from the first station over the primary frequency channel after transmission of the first data packet is complete, and the first block acknowledgment and the second block acknowledgment being received at a same time.

* * * * *